United States Patent
Tsai

(10) Patent No.: US 10,374,776 B2
(45) Date of Patent: Aug. 6, 2019

(54) BASE STATION, USER EQUIPMENT FOR INTEGRATING MULTIPLE RATS USING CARRIER AGGREGATION AND METHODS THEREOF

(71) Applicant: Industrial Technology Research Institute, Hsinchu (TW)

(72) Inventor: Tzu-Jane Tsai, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 428 days.

(21) Appl. No.: 14/887,346

(22) Filed: Oct. 20, 2015

(65) Prior Publication Data

US 2016/0149686 A1     May 26, 2016

Related U.S. Application Data

(60) Provisional application No. 62/082,144, filed on Nov. 20, 2014.

(51) Int. Cl.
*H04L 5/00* (2006.01)
*H04L 1/18* (2006.01)

(52) U.S. Cl.
CPC .............. *H04L 5/0055* (2013.01); *H04L 1/18* (2013.01); *H04L 5/001* (2013.01); *H04L 5/0023* (2013.01)

(58) Field of Classification Search
CPC ......... H04L 1/18; H04L 5/001; H04L 5/0023; H04L 5/0055
USPC ......................................................... 370/329
See application file for complete search history.

(56) References Cited

U.S. PATENT DOCUMENTS

| 8,989,025 | B2 | 3/2015 | Kazmi et al. |
| 9,137,641 | B2 | 9/2015 | Kojima |
| 2006/0092955 | A1 | 5/2006 | Durbin et al. |
| 2007/0283041 | A1 | 12/2007 | Chung et al. |
| 2012/0140743 | A1 | 6/2012 | Pelletier et al. |

(Continued)

FOREIGN PATENT DOCUMENTS

| CN | 102124689 | 7/2011 |
| CN | 102948104 | 2/2013 |
| EP | 2675241 | 12/2013 |
| TW | 201311019 | 3/2013 |
| WO | 2013052805 | 4/2013 |

OTHER PUBLICATIONS

TSG-RAN Chairman, "Summary of 3GPP TSG-RAN Workshop on Relseas 12 and Onward," 3GPP Workshop on Release 12 and Onward RWS-120045, Jun. 11-12, 2012, pp. 1-6.

(Continued)

*Primary Examiner* — Huy D Vu
*Assistant Examiner* — Nizam U Ahmed
(74) *Attorney, Agent, or Firm* — JCIPRNET

(57) ABSTRACT

A base station, for integrating multiple Radio Access Technologies (RATs) using Carrier Aggregation (CA) inlcudes a WAN MAC entity, an adapter and a WLAN entity. The adapter is connected to one of a plurality of HARQ buffers and receives DL WAN MPDUs stored in the HARQ buffer, and converts the DL WAN MPDUs into a pluarlity of DL WLAN MPDUs. The WLAN MAC entity is coupled to the adapter, receives the DL WLAN MPDUs, wherein the WAN MAC entity respectively transmit the DL WAN MPDUs through transport channels, and the WLAN MAC entity transmits the DL WLAN MPDUs to be time-aligned with the DL WAN MPDUs.

33 Claims, 17 Drawing Sheets

(56) References Cited

U.S. PATENT DOCUMENTS

| | | | |
|---|---|---|---|
| 2013/0051264 A1* | 2/2013 | Wang | H04L 5/0098 370/252 |
| 2013/0083783 A1 | 4/2013 | Gupta et al. | |
| 2013/0148640 A1* | 6/2013 | Li | H04L 1/1809 370/338 |
| 2013/0242897 A1 | 9/2013 | Meylan et al. | |
| 2013/0250925 A1* | 9/2013 | Lohr | H04W 72/0446 370/336 |
| 2014/0050086 A1 | 2/2014 | Himayat et al. | |
| 2014/0112247 A1 | 4/2014 | Chen et al. | |
| 2014/0161002 A1* | 6/2014 | Gauvreau | H04L 1/1893 370/280 |
| 2014/0213310 A1 | 7/2014 | Yeh et al. | |
| 2014/0241265 A1 | 8/2014 | Pragada et al. | |
| 2015/0117357 A1 | 4/2015 | Ozturk et al. | |

OTHER PUBLICATIONS

Intel Corporation, "New study Item Proposal on WLAN/3GPP Radio Interworking," 3GPP TSG-RAN Meeting #57, RP-1201228, Sep. 13-15, 2012, pp. 1-5.

Intel Corporation, "New SI Proposal : LTE-WLAN Radio Level Integration," 3GPP TSG-RAN Meeting #65, RP141679, Sep. 9-12, 2014, pp. 1-6.

Intel Corporation, "New Study Item Proposal : Integrated LTE-WLAN RATs," 3GPP TSG-RAN Meeting #64, RP140684, Jun. 10-13, 2014, pp. 1-6.

Qualcomm Incorporated, "Study Item Proposal on E-UTRAN and WLAN Aggregation" 3GPP TSG-RAN Meeting #64, Jun. 10-13, 2014, pp. 1-6.

Qualcomm Incorporated, "Study Item Proposal on E-UTRAN and WLAN Aggregation" 3GPP TSG-RAN Meeting #65, RP141400, Sep. 9-12, 2014, pp. 1-6.

Broadcom Corporation, "RAN offload solutions using LTE-WLAN IP Flow Level Aggregation," 3GPP TSG RAN #65, RP141228, Sep. 2014, pp. 1-7.

Intel Corporation et al., "New SI Proposal : LTE-WLAN Radio Level Integration," 3GPP TSG-RAN Meeting #66, RP141964, Dec. 8-11, 2014, pp. 1-7.

Intel Corporation et al., "New WI Proposal : LTE-WLAN Radio Level Integration and Interworking Enhancement," 3GPP TSG-RAN Meeting #67, RP150504, Mar. 9-12, 2015, pp. 1-9.

"Office Action of Taiwan Counterpart Application," dated Oct. 7, 2016, p. 1-p. 6.

"Office Action of China Counterpart Application", dated Apr. 4, 2018, p. 1-p. 7.

* cited by examiner

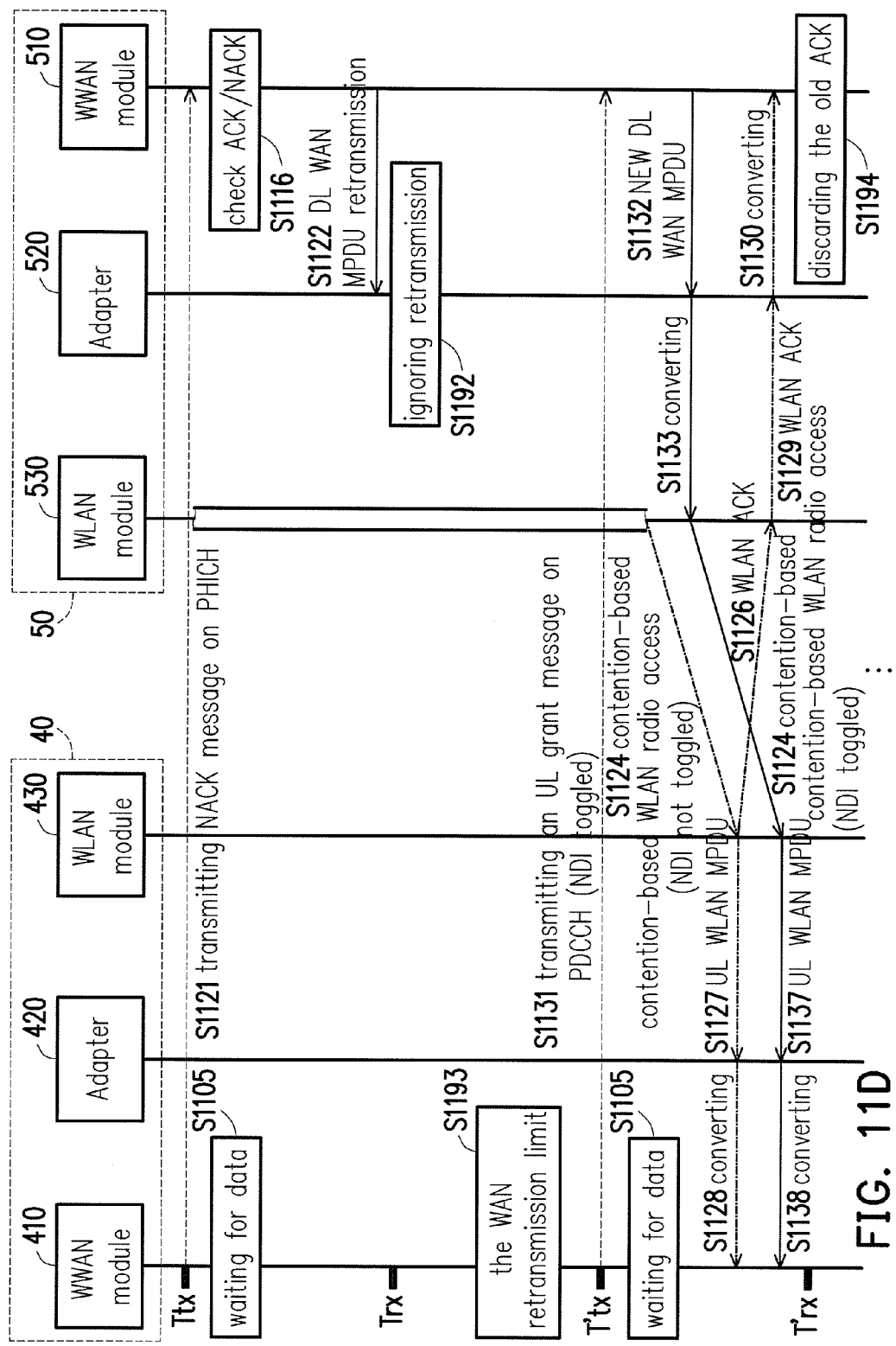

BASE STATION, USER EQUIPMENT FOR INTEGRATING MULTIPLE RATS USING CARRIER AGGREGATION AND METHODS THEREOF

CROSS-REFERENCE TO RELATED APPLICATION

This application claims the priority benefits of U.S. provisional application Ser. No. 62/082,144, filed on Nov. 20, 2014. The entirety of the above-mentioned patent application is hereby incorporated by reference herein and made a part of this specification.

TECHNICAL FIELD

The technical field relates to a base station and a user equipment for integrating multiple Radio Access Technologies (RATs) using Carrier Aggregation and methods thereof.

BACKGROUND

With increased consumer demand for mobile broadband and Internet access, recently wireless service providers have implemented cellular carrier aggregation to increase the available bandwidth of wireless wide area networks (WWANs). Furthermore, approaches involving integrating other Radio Access Technologies (RATs) along with the 3GPP Long Term Evolution-Advanced (LTE-A) mobile radio access network are also being developed, so that data traffic could be offload to other RATs and the throughput of transmitting data could be improved thereby. FIG. 1 illustrates a schematic diagram of a communication system including the integration of WWAN and wireless local area network (WLAN). Referring to FIG. 1, the system includes a UE 810 under the coverage of an eNB 820 and an access point (AP) 830. In this system, the AP 830 (which could be compatible with the IEEE 802.11 protocols) would integrated with the eNB 820, and would be connected to Internet 850 through the eNB 820 and the core network 840 behind the eNB 820. As a result, the data transmission between the UE 810 and Internet 850 could be transferred via two paths, the path between the eNB 820 and the UE 810 (e.g., the path P1 using Evolved Universal Terrestrial Radio Access (E-UTRA)), and the path between the AP 830 and the UE 810 (e.g., the path P2 using the 802.11x series of RAT). Also, the eNB 820 would have the ability to control which path could be used to transfer the data. In transmission condition having serious congestion on the path P1, the data from/to the UE 810 could still be successfully transferred by offloading the data to the path P2.

Conventionally, for integrating RATs used in WLANs, e.g., the IEEE 802.11x series of RAT, with WWANs (e.g., RAT used in the LTE-A network), the two access technologies are integrated on the Internet Protocol (IP) layer at the Packet Data Network Gateway (PDN GW, PGW or PDG) inside the core network. Specifically, the integration of WLANs with WWANs can be classified into three categories, namely, no coupling, loose coupling and tight coupling. In the category of no coupling, the WLAN access points are connected to the public internet and the integration point is on the application layer. This is currently the most prevalent way of integration in smart phones or other mobile electronic devices. In loose coupling, a core network entity referred to as ePDG (enhanced Packet Data Network Gateway) is defined in 3GPP S2b architecture to connect operator deployed WLAN access points to the mobile network, and this allows the mobile network operators the ability to route the data traffic through the two networks on the IP layer and to better manage the WLAN access points they deploy. However, progress in this path has been slow and its commercialization seems far away. In other words, based on the conventional loose-coupling architecture, the eNB does not have enough ability to control the radio resource management of LTE and WLAN, so an integration of radio resource management (RRM) of LTE/WLAN is a difficult job. Furthermore, the radio resources from the WLANs and WWANs are not integrated to be efficiently utilized. This deficiency leads to the third category, namely the tight coupling, which is the most efficient and responsive solution but requires more changes in specifications.

The willingness to bring forth the necessary changes is evidenced recently in recent researches, which stated that RAN-level aggregation provides many benefits, such as dynamic allocation of resources based on RF and load conditions, higher aggregate user throughput and system throughput, real-time load balancing and RAN-level seamless handover support. As a result, a novel architecture along with the associated operational procedures that fulfill such goal would be a major issue for those who have skills in the art.

SUMMARY

In one of exemplary embodiments of the present disclosure, the base station for integrating multiple Radio Access Technologies (RATs) using Carrier Aggregation (CA) includes but not limited to a Wide Area Network (WAN) Media Access Control (MAC) entity, a first adapter and a first WLAN MAC entity. The WAN MAC entity includes a scheduler, a plurality of Hybrid Automatic Repeat request (HARQ) buffers and a multiplexer. The scheduler assigns a plurality of Downlink (DL) WAN MAC Protocol Data Units (MPDUs) to a plurality of transport channels. The HARQ buffers are connected to the scheduler and each of the HARQ buffers respectively connects to one of the transport channels, wherein each of the HARQ buffers stores part of the DL WAN MPDUs. The multiplexer is coupled to the scheduler, connected between the scheduler and the HARQ buffers, the multiplexer distributes the DL WAN MPDUs to the HARQ buffers according to the assignation from the scheduler. The first adapter is connected to a first HARQ buffer of the HARQ buffers, receives the DL WAN MPDUs stored in the first HARQ buffer, and converts the DL WAN MPDUs into a plurality of DL Wireless Local Area Network (WLAN) MPDUs. The first WLAN MAC entity is coupled to the first adapter, receives the DL WLAN MPDUs. the WAN MAC entity respectively transmit the DL WAN MPDUs through the transport channels, and the first WLAN MAC entity transmits the DL WLAN MPDUs to be time-aligned with the DL WAN MPDUs.

In one of exemplary embodiments of the present disclosure, the method of integrating multiple RATs using CA, for a base station to transmit data in a downlink path, includes but not limited to the step of: assigning a plurality of Downlink (DL) WAN MAC Protocol Data Units (MPDUs) to a plurality of transport channels; converting the DL WAN MPDUs corresponding to one of the transport channels into a pluarlity of DL WLAN MPDUs; and transmitting the DL WAN MPDUs through the transport channels, and transmitting the DL WLAN MPDUs to be time-aligned with the DL WAN MPDUs.

In one of exemplary embodiments of the present disclosure, the method of integrating multiple RATs using CA, for a base station to transmit data in a uplink path, includes but not limited to the step of: at time point Ttx, transmitting a UL grant message through a PDCCH from a primary Component Carrier (CC),and determining whether a UL WAN MPDU in response to the first UL grant message is received before time point T'tx, wherein the T'tx=Ttx+Δ, and Δ is a positive value bigger than 1 msec; and if the UL WAN MPDU is received through a WLAN MAC entity of the base station before time point T'tx, transmitting a second UL grant message.

In one of exemplary embodiments of the present disclosure, the user equipment, for integrating multiple RATs using CA, includes but not limited to a WAN MAC entity, an adapter and a WLAN MAC entity. The WAN MAC entity, receives a UL grant message corresponding to a first UL WAN MPDU on PDCCH. The adapter is coupled to the WAN MAC entity. The WLAN MAC entity is coupled to the adapter. When the WAN MAC entity deteremines that the UL grant message including resource information correponding to a WLAN, the WAN MAC entity transmits the first UL WAN MPDU to the adapter. The adapter converts the first UL WAN MPDU into a first UL WLAN MPDU and transmits the first UL WLAN MPDU to the WLAN MAC entity. And, the WLAN MAC entity transmits the first UL WLAN MPDU.

In one of exemplary embodiments of the present disclosure, the method of integrating multiple RATs using CA, for a user equipment includes but not limited to the step of: receiving a UL grant message corresponding to a first UL WAN MPDU on PDCCH; deteremining whether the UL grant message comprising resource information correponding to a WLAN; and when the UL grant message comprising resource information correponding to a WLAN is determined, transmitting the first UL WAN MPDU through a WLAN MAC entity of the UE.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

FIG. 3A and 3B illustrating an example of the data packet behavior of the WAN-HARQ-aligned transmission by the WLAN MAC entity according to an exemplary embodiment of the present disclosure.

FIG. 11A-11D illustrate time flow chart of four cases based on the timing of the UL WLAN transmission according to exemplary embodiments of the present disclosure.

DETAILED DESCRIPTION OF DISCLOSED EMBODIMENTS

In this disclosure, 3GPP-like keywords or phrases are used merely as examples to present inventive concepts in accordance with the present disclosure; however, the same concept presented in the disclosure can be applied to any other systems such as IEEE 802.11, IEEE 802.16, LTE, and so like by persons of ordinarily skilled in the art.

This disclosure aims to provide an interface between the WWAN (e.g., the LTE Carrier Aggregation (CA) architecture) and WLAN (specifically, MAC layer of WLAN) to tightly couple these two access technologies with minimum impact on the specifications and existing implementations. The integration of the two technologies under the MAC layer of one of them allows the higher protocol layers such as Radio Link Control (RLC) and Packet Data Convergence Protocol (PDCP) to remain intact. Moreover, by combining the contention-based WLAN access with the scheduling-based LTE access, the radio resource of the unlicensed spectrum can be more efficiently utilized. It is noted that in this disclosure, the WWAN would be implemented as LTE-CA, so the term "WAN", "WWAN", "LTE" and "LTE-CA" would be used interchangeably in this disclosure, but the implementation of WWAN is not limited thereto.

The fundamental principle of the disclosure is to bring the integration point of these two RAT technologies deeper into the protocol stack on MAC layer and closer to the User Equipment (UE) inside the radio access network, thereby allowing a tighter integration for seamless and joint management of the two radio resources. The end results are better utilization of the radio resources and transparent and improved user experience.

Moreover, the disclosure provides an integration interface using the existing Carrier Aggregation (CA) architecture that is already defined in 3GPP for integrating multiple LTE carriers. Since carrier aggregation in LTE-A is a MAC layer procedure with little or no involvement of physical layer operation, a novel adapter (i.e., layer) is provided in this disclosure to insert the contention-based WLAN radio access into one or more of the LTE component carriers. The physical layer aspects of the WLAN component carriers still comply with the contention nature of WLAN and can therefore co-exist with other WLAN devices sharing the same unlicensed spectrum. Since the physical layers of both integrated technologies are intact, only software changes are required for the integration.

Figure 1:
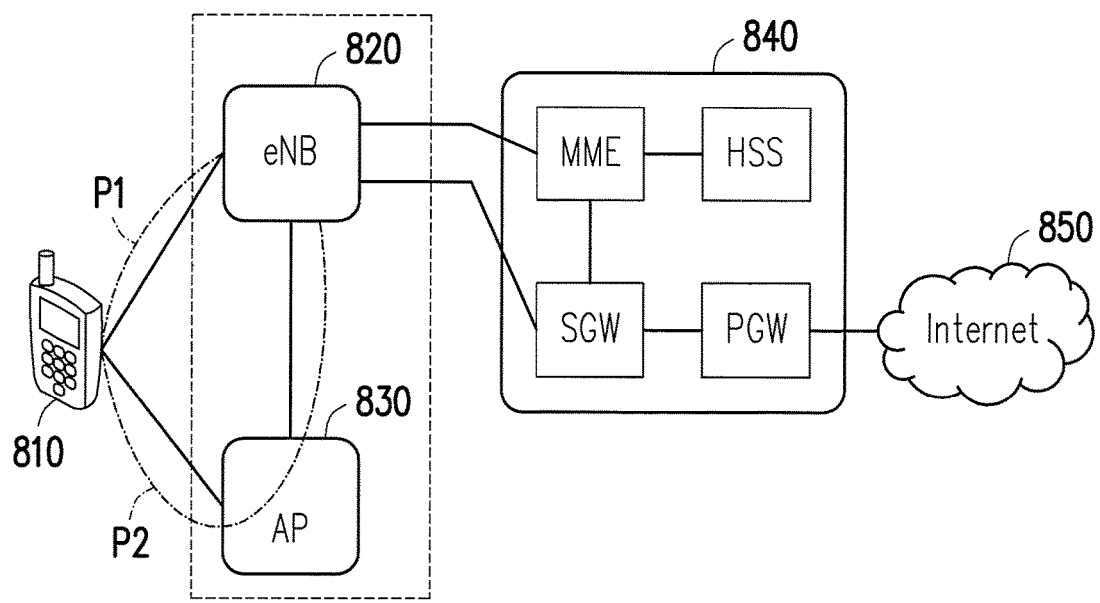
FIG. 1 illustrates a schematic diagram of a communication system including the integration of wireless wide area networks (WWANs) and wireless local area network (WLAN).
Figure 2:
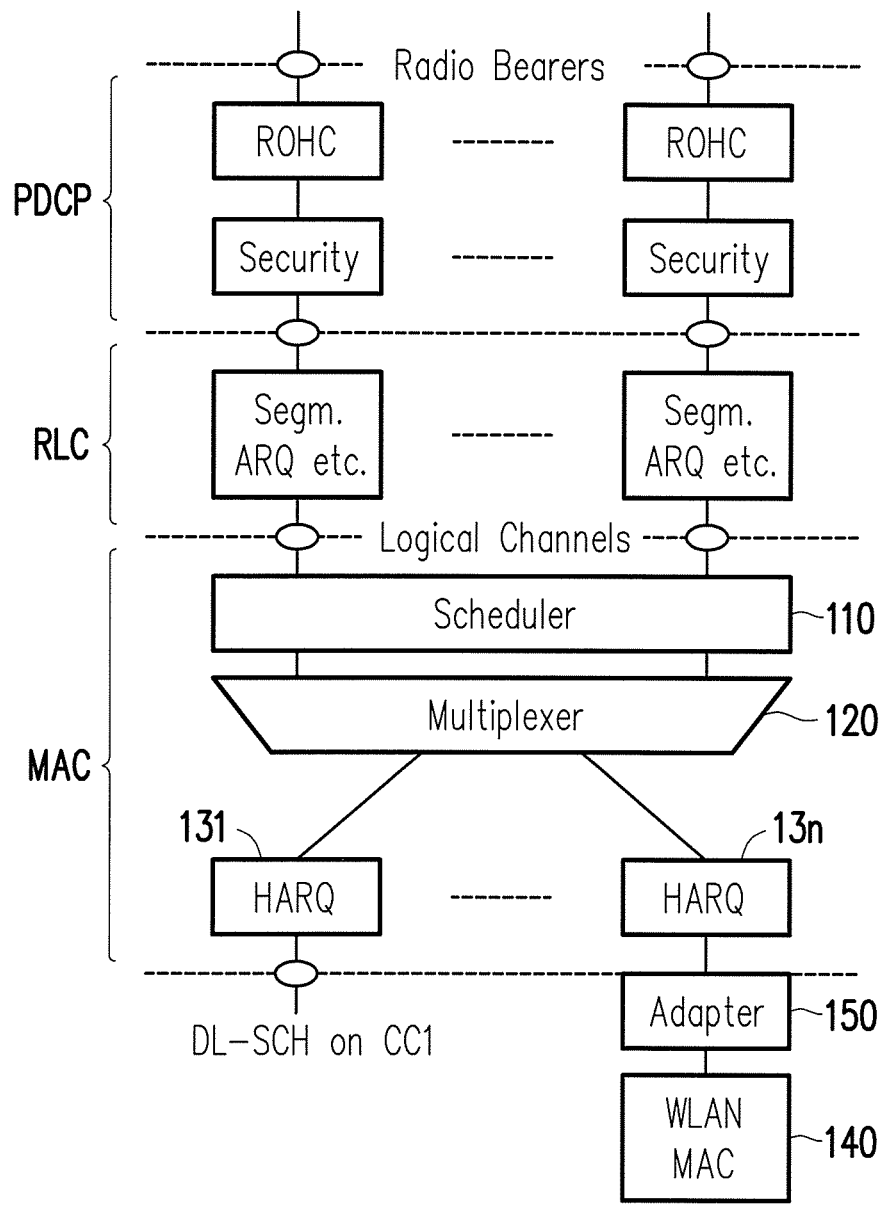
FIG. 2 illustrates a basic architecture of a LTE downlink Carrier Aggregation within a base station according to an exemplary embodiment of the present disclosure.

FIG. 2 illustrates a basic architecture of a LTE downlink Carrier Aggregation within a base station according to an exemplary embodiment of the present disclosure, wherein each of the UEs in radio coverage of the eNB may be allocated one or more component carriers. The architecture described herein could be viewed as a WWAN Radio Access Network (RAN) entity, and includes Packet Data Convergence Protocol (PDCP) entity, a Radio Link Control (RLC) entity and MAC entity, which may respectively corresponds to PDCP layer, RLC layer and MAC layer in protocol stack of LTE-CA. Also, the architecture may be incorporated in a controller, processor, scheduler, and/or other elements.

The MAC entity (i.e., the WAN MAC entity) includes a scheduler 110, a multiplexer 120 and Hybrid Automatic Repeat reQuest (HARQ) buffers 131-13n. The scheduler 110 assigns a plurality of Downlink (DL) WAN MAC Protocol Data Units (MPDUs), i.e., the downstream data, to a plurality of transport channels. The HARQ buffers 131-13n are connected to the scheduler and each of the HARQ buffers respectively connects to one of the transport channels, wherein each of the HARQ buffers stores part of the DL WAN MPDUs which the scheduler 110 assigned. The multiplexer 120 is coupled to the scheduler 110 and connected between the scheduler 110 and the HARQ buffers 131-13n. The multiplexer 120 distributes the DL WAN MPDUs to the HARQ buffers 131-13n according to the assignation from the scheduler 110.

It is noted that each of the transport channels corresponds to a component carrier in the LTE-CA system, and one of the component carriers would be a primary component carrier. In the present exemplary embodiment, the number of the component carrier is set as n (which would be an integer bigger than 1), so the number of HARQ buffers 131-13n would also be n. The DL WAN MPDUs are multiplexed in the MAC entity to the multiple component carriers to achieve a greater capacity. Each component carrier has an associated the HARQ buffers 131-13n so as to ensure the integrity of the data communication in the MAC layer could be in a spectrally efficient manner.

The original design of LTE Carrier Aggregation architecture is intended for the aggregation of multiple LTE carriers. However, in this disclosure, one (or more) of the component carrier would be replaced with a WLAN carrier. As shown in FIG. 2, in the present embodiment, a WLAN MAC entity 140 of the base station is connected to the HARQ buffer 13n. Since the WLAN MAC layer protocol and structure of data are different from that of LTE, an adapter 150 is disposed between the HARQ buffer 13n and the WLAN MAC entity 140 to convert the WAN MPDUs to WLAN MPDUs, which are then processed through the WLAN MAC entity 140 utilizing services provided by the WLAN physical layer.

To minimize the impact on implementation originally designed for the aggregation of LTE carriers, the adapter 150 adheres to the timing sequence of WAN (i.e., LTE-CA) in the present disclosure, so that the WLAN MAC entity 140 would transmit the DL WLAN MPDUs to be time-aligned with the DL WAN MPDUs transmitted via other LTE component carriers. The basic unit interval in LTE physical layer is 1 msec, which corresponds to one Transmission Time Interval (TTI). In each TTI, a component carrier can carry either one MAC PDU (that is also known as a Transport Block (TB)) or two in case of certain multi-antenna scheme. Each component carrier represents a transport channel, and is associated with an HARQ buffer (e.g., the HARQ buffer 131-13n) which would be independent from each other. The HARQ buffer (e.g., the HARQ buffer 131) may have a plurality of (e.g., up to 8) parallel stop-and-wait HARQ process queues operating in pipeline. Therefore, the adapter 150 needs to map the DL WAN MAC PDUs into DL WLAN MAC PDUs, properly configures the HARQ and ensure that the WLAN Physical layer entity could deliver the data packets (corresponding to the WLAN MAC PDUs) to the HARQ processes in a timely and orderly manner.

In other embodiment of the present disclosure, more component carriers would be replaced with WLAN carriers. For example, another WLAN MAC entity such as a second WLAN MAC entity (not shown) of the base station is connected to the HARQ buffer 13n-1. A second adapter (not shown) would be disposed between the HARQ buffer 13n-1 and the second WLAN MAC entity to convert the WAN MPDUs to WLAN MPDUs. When the WAN MAC entity respectively transmit the DL WAN MPDUs through the transport channels, the WLAN MAC entity 140 and the second WLAN MAC entity transmit the DL WLAN MPDUs to be time-aligned with the DL WAN MPDUs. However, the numebrs of WLAN MAC entities and corresponding adapters would not be limited in the present disclosure.

Figures 3A, 3B:
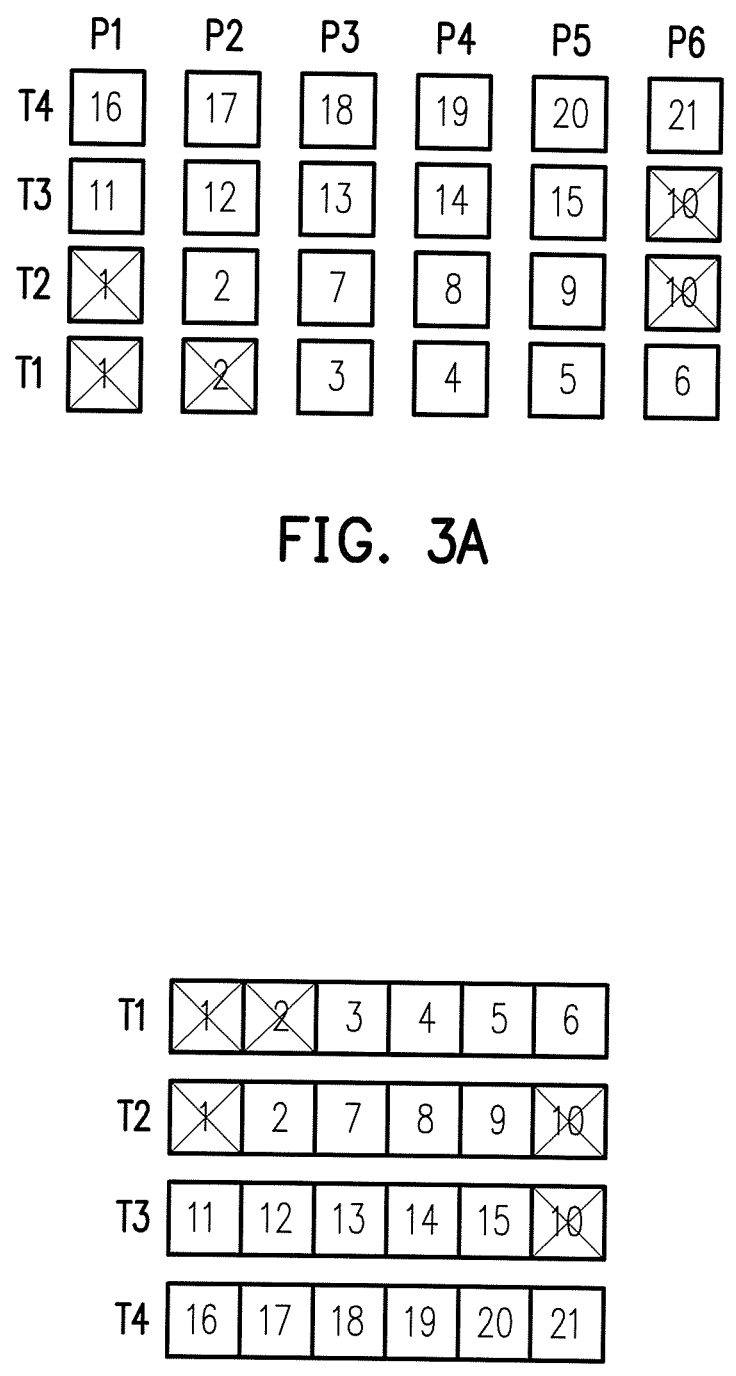

FIG. 3A and 3B illustrating an example of the data packet behavior of the WAN-HARQ-aligned transmission by the WLAN MAC entity according to an exemplary embodiment of the present disclosure. FIG. 3A illustrates the relationships between the DL WAN MPDUs and the HARQ process queues in one HARQ buffer according to the exemplary embodiment of the present disclosure. In the present exemplary embodiment, one HARQ buffer (e.g., the HARQ buffer 13n) includes 6 HARQ process queues P1-P6. Each of the HARQ process queues P1-P6 includes DL WAN MPDUs that are timely-aligned. And the timely-aligned DL WAN MPDUs are scheduled to be transmitted in the same time. For example, DL WAN MPDUs 1, 2, 3, 4, 5, 6 respectively stored in the HARQ process queue P1-P6 are scheduled to be transmitted at T1 simultaneously. And in this example, the retransmission limit value of LTE is set as 1. Assuming that the transmission of the DL WAN MPDU 1, 2 are failed (e.g., lost, or error) during transmission, the DL WAN MPDUs 1, 2, 7, 8, 9, 10 would be schedule to transmit at the next transmission time (e.g., T2) since the DL WAN MPDU 1, 2 need to be re-transmitted, and so on.

FIG. 3B illustrates the relationship between the DL WAN MPDUs stored in the HARQ process queues and WLAN Aggregation-MPDUs (A-MPDUs) according to the present exemplary embodiment of the present disclosure. It is noted that in the present example, one WLAN A-MPDU including six DL WAN MPDUs would be scheduled to transmit at one time and the retransmission limit value of LTE is set to 1. And the transmission behavior via WLAN could still be timely-aligned with the other DL WAN MPDUs that are to be transmitted through other transport channels (i.e., through the component carriers of LTE-CA), even the transmission condition of the WLAN link suffers high TB error rate, e.g., as shown in both FIG. 3A and 3B, DL WAN MPDU 1, 2 are dropped at T1 and DL MAC MPDU 1, 10 are dropped at T2.

Detailed description of the functions performed by the adapter and the timing control process between the WAN MAC entity and the WLAN entity would be provided below. Note that the description below in regard to protocol behavior uses downlink in an eNB as example unless otherwise specified. The behavior of the protocol carried out by its peer in the UE can be easily understood by those skilled in the art.

Figure 4A:
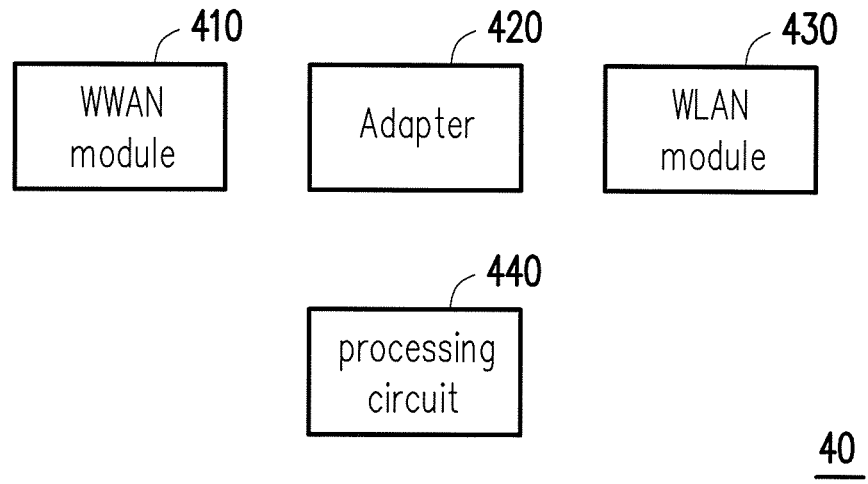
FIG. 4A illustrates a functional block diagram of a base station according to an exemplary embodiment of the present disclosure.
Figure 4B:
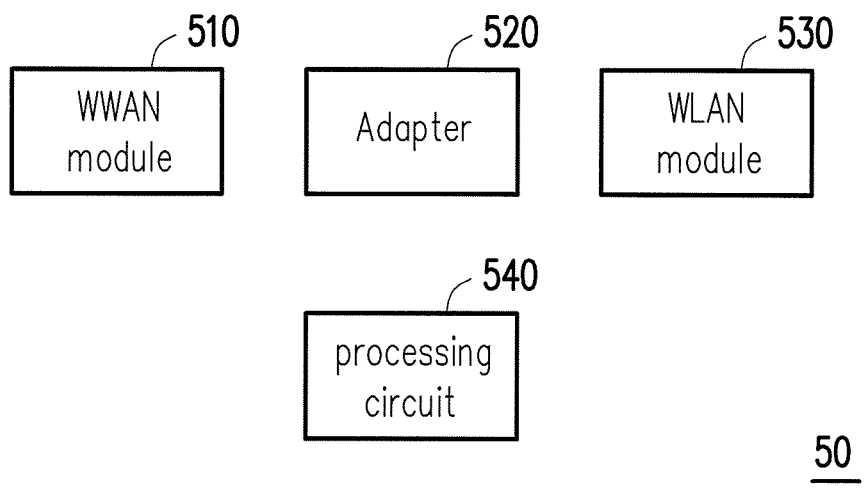
FIG. 4B illustrates a functional block diagram of a UE according to an exemplary embodiment of the present disclosure.

FIG. 4A illustrates a functional block diagram of a base station according to an exemplary embodiment of the present disclosure, and FIG. 4B illustrates a functional block diagram of a UE according to an exemplary embodiment of the present disclosure. Referring to FIG. 4A, the base station 40 at least includes a WWAN module 410, an adapter 420 and a WLAN module 430 and a processing circuit 440. The WAN MAC entity shown in FIG. 2 could be included in the WWAN module 410, and the WLAN MAC entity 140 shown in FIG. 2 could be included in the WLAN module 430. The WWAN corresponds to LTE, LTE-A, LTE-CA and the like in the present disclosure, and WLAN corresponds to IEEE 802.11x series of WLAN protocol, but not limited thereto. The adapter 420 may correspond to the adapter 150 depicted in FIG. 2. The WWAN module 410, adapter 420 and the WLAN module 430 could be implemented by hardware or software jointly or separately. For example, the WLAN module 430 could be access point of a WLAN and would be disposed independently out of the base station 40, and the base station 40 would be able to control and access the WLAN module remotely. In another example, the WWAN module 410, adapter 420 and the WLAN module 430 could be implemented by independent circuit. Or, the WWAN module 410, adapter 420 and the WLAN module 430 could be programmed codes with corresponding function stored in a memory circuit of the processing circuit 440, such that the processing circuit 440 could implement the functions of the WWAN module 410, adapter 420 and the WLAN module 430 by loading and executing the programmed codes thereof, but the disclosure is not limited thereto.

Referring to FIG. 4B, similar to the base station 40 depicted FIG. 4A, the UE 50 at least includes a WWAN module 510, an adapter 520 and a WLAN module 530 and a processing circuit 540. The WAN MAC entity shown in FIG. 2 could be included in the WWAN module 510, and the WLAN MAC entity 140 shown in FIG. 2 could be included in the WLAN module 530. The adapter 520 may correspond to the adapter 150 depicted in FIG. 2. The WWAN module 510, adapter 520 and the WLAN module 530 could be implemented by hardware or software jointly or separately. For example, the WWAN module 510, adapter 520 and the WLAN module 530 could be implemented by independent circuit. Or, the WWAN module 510, adapter 520 and the WLAN module 530 could be programmed codes with corresponding function stored in a memory circuit of the processing circuit 540, such that the processing circuit 540 could implement the functions of the WWAN module 510, adapter 520 and the WLAN module 530 by loading and executing the programmed codes thereof, but the disclosure is not limited thereto. It is noted that the downstream data distributed in the WAN MAC entity in the WWAN module 410 of the base station 40 shown in FIG. 4A are DL WAN MPDUs, same as shown in FIG. 2, whereas the upstream data distributed in the WAN MAC entity in the WWAN module 510 of the UE 50 shown in FIG. 4B are uplink (UL) WAN MPDUs.

It is noted that the base station (BS) 40 in this disclosure would be referred to as a control node or an eNB. It should be noted that the references of such are merely exemplary and therefore do not serve as limitations to the type of control nodes as it would be apparent to those skilled in the art that other types of control node could be selected to achieve network control purposes such as an advanced base station (ABS), a base transceiver system (BTS), an access point, a home base station, a relay station, a repeater, an intermediate node, an intermediary, and/or satellite-based communication base stations.

From the hardware perspective, the base station 40 may also be referred to as an apparatus including at least but not limited to a transmitter circuit, a receiver circuit, an analog-to-digital (A/D) converter, a digital-to-analog (D/A) converter, a processing circuit (e.g., the processing circuit 440), one or more antenna units, and optionally a storage medium. The transmitter and the receiver transmit downlink signals and receive uplink signals wirelessly. And the WWAN module 410 and the WLAN module 430 could respectively correspond to different transmitters and receivers. The receiver may include functional elements to perform operations such as low noise amplifying, impedance matching, frequency mixing, down frequency conversion, filtering, amplifying, and so forth. The transmitter may include function elements to perform operations such as amplifying, impedance matching, frequency mixing, up frequency conversion, filtering, power amplifying, and so forth. The analog-to-digital (A/D) or the digital-to-analog (D/A) converter is configured to convert from an analog signal format to a digital signal format during uplink signal processing and from a digital signal format to an analog signal format during downlink signal processing.

The processing circuit 440 in the base station 40 or the processing circuit 540 in the UE 50 is configured to process digital signal and to perform procedures related to the proposed method in accordance with exemplary embodiments of the present disclosure. Also, the processing circuit may optionally be coupled to a memory circuit to store programming codes, device configurations, a codebook, buffered or permanent data, and etc. . . . . The functions of the processing circuit may be implemented using programmable units such as a micro-processor, a micro-controller, a DSP chips, FPGA, etc. The functions of the processing circuit may also be implemented with separate electronic devices or ICs, and the processing circuit may also be implemented with either hardware or software.

The term "user equipment" (UE) (e.g., UE 50 shown in FIG. 4B) in this disclosure could represent various embodiments which for example could include but not limited to a mobile station, an advanced mobile station (AMS), a server, a client, a desktop computer, a laptop computer, a network computer, a workstation, a personal digital assistant (PDA), a tablet personal computer (PC), a scanner, a telephone device, a pager, a camera, a television, a hand-held video game device, a musical device, a wireless sensor, and so like. In some applications, a UE may be a fixed computer device operating in a mobile environment, such as a bus, train, an airplane, a boat, a car, and so forth.

From the hardware perspective, a UE 50 may also be referred to as an apparatus which includes at least but not limited to a transmitter circuit, a receiver circuit, an analog-to-digital (A/D) converter, a digital-to-analog (D/A) converter, a processing circuit, one or more antenna units, and optionally a memory circuit. The memory circuit may store programming codes, device configurations, buffered or permanent data, codebooks, and etc. . . . . The processing circuit may also be implemented with either hardware or software. The function of each element of a UE is similar to a control node and therefore detailed descriptions for each element will not be repeated.

Originally, the DL/UL WAN MPDU corresponds to a Transport Block that will be processed by the WAN physical entity (which would be coupled to the WAN MAC entity via the transport channels) into modulated symbols, which are then assigned by the scheduler to certain numbers of Physical Resource Blocks (PRBs) within the one msec time-frequency plane. In this disclosure, one or more of the component carriers the WAN physical entity is replaced by WLAN. As a result, one of the primary functions of the adapter (e.g., the adapter 150 shown in FIG. 2) is therefore to map the WAN MPDU to the WLAN MPDU. The WLAN MPDU is then processed through the WLAN MAC/PHY layer protocols in accordance with the contention based mechanism.

The adapter 150 (also, the adapter 420 shown in FIG. 4A and the adapter 520 shown in FIG. 4B) needs to adhere several information to the WAN MPDUs or the WLAN MPDU during conversion between the WAN MPDUs into the WLAN MPDU, such as the WLAN MAC address of the target UE (e.g., the UE 50 shown in FIG. 4B), the Cell Radio Network Temporary Identifier (C-RNTI) of the target UE, the HARQ process IDs respectively corresponding to each the WAN MPDUs and/or a new data indication (NDI) identifier respectively corresponding to each the WAN MPDUs.

Figure 5:
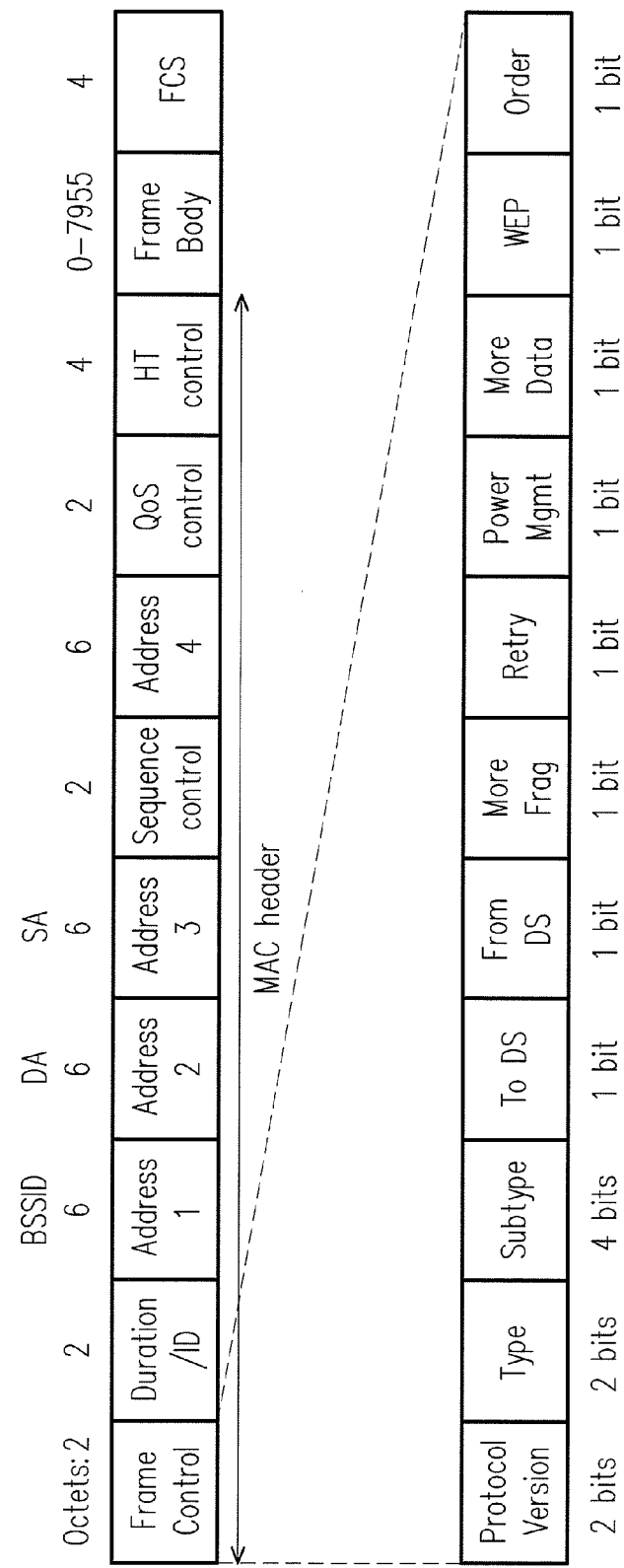
FIG. 5 illustrates a schematic diagram of an 802.11n MAC frame format.

When attached to an LTE cell, a UE (e.g., the UE 50 shown in FIG. 4B) is assigned by the base station (e.g., the base station 40 shown in FIG. 4A) a unique Cell Radio Network Temporary Identifier (C-RNTI) that is used, among other signaling between the UE and the network, for the identification of HARQ retransmission. On the other hand, an identity of a UE is determined by MAC address of the UE. As a result, in order for the LTE HARQ processes to correctly determine the owner of a DL/UL WAN MPDU, a mapping table between a UE's WLAN MAC address and the UE's C-RNTI together with its HARQ ID should be maintained by the adapter 150.

the HARQ process ID (e.g., 3 bits) is attached in the WLAN MPDU for the adapter 150 to recognize the corresponding WAN MPDU and put WAN MPDU to the corresponding HARQ process queue in the HARQ buffer (e.g., HARQ process queue P1-P6 shown in FIG. 3A). The NDI identifier could be with 1 bit for WAN MAC entity to recognize whether this is an old/new MPDU, and this information could be optionally implemented. FIG. 5 illustrates a schematic diagram of an 802.11n MAC frame format, which may be viewed as a frame format of WLAN MPDU according to one exemplary of the present disclosure. Referring to FIG. 5, the WAN MPDU and the above-described information that are to be attached in the WLAN MPDU could be adhered in certain columns in the frame format. For example, the NDI identifier and the HARQ process ID could be appended in the 'type' and 'subtype' column in the MAC header, using reserved values of these columns to represent NDI identifier and the HARQ process ID, e.g., set value of 'type' column as '11' (which is a reserved value for the 'type' column) to represent NDI, and set value of 'subtype' column between 0000-1111 (which are reserved values for the 'subtype' column) to indicate the HARQ process ID, but the disclosure is not limited thereto.

Also, when converting a WAN MPDU in to a WLAN MPDU, besides the above-described information, the WAN MPDU can be directly fitted in the 'frame body' column of the WLAN MPDU. It is noted that the WLAN MPDU is 802.11 MAC frame. The maximum size of the 'frame body' column of the 802.11 MAC frame is fixed (i.e., 7955 bits of 802.11n, for example, as shown in FIG. 5). When the size of the WAN MPDU is larger than the size of the 'frame body' column of the 802.11 MAC frame, the adapter 150 may fragment the WAN MPDU into several (at least more than 1) WLAN MPDUs during conversion.

Figure 6:
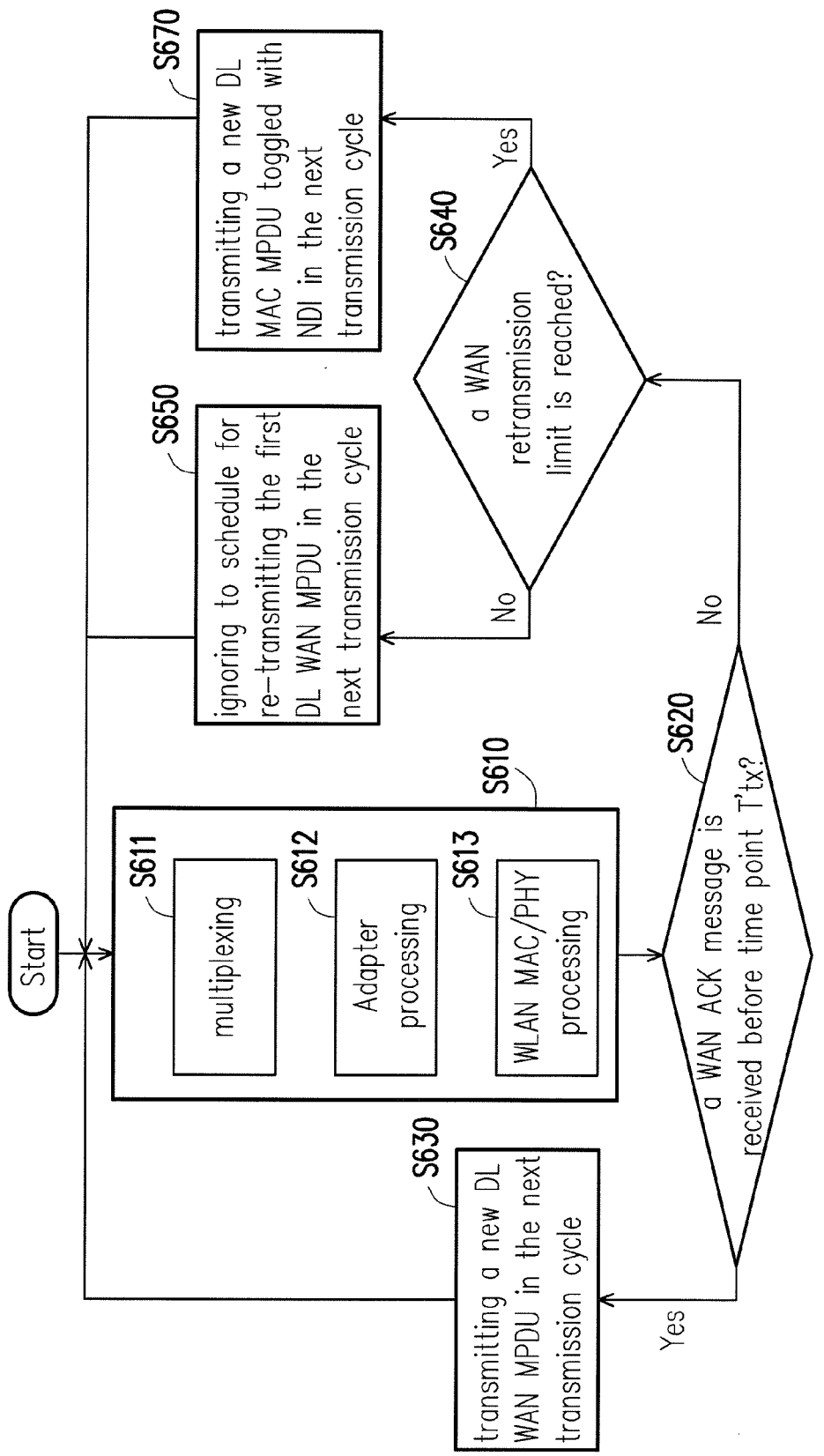
FIG. 6 illustrates a flow chart of the method of integrating multiple Radio Access Technologies (RATs) using Carrier Aggregation (CA) according to an exemplary embodiment of the present disclosure.

FIG. 6 illustrates a flow chart of the method of integrating multiple Radio Access Technologies (RATs) using Carrier Aggregation according to an exemplary embodiment of the present disclosure, wherein the method is configured for a base station (e.g., base station 40 in FIG. 4A) to transmit data in a downlink path. Referring to FIG. 6, assuming that the WAN MAC entity (or to be more specific, the scheduler 110 in the WAN MAC entity) schedules to transmit the first DL WAN MPDU through a WLAN MAC entity 140 of the base station (e.g. base station 40 shown in FIG. 4A) at time point Ttx (i.e., the current transmission cycle), and schedules to transmit the second DL WAN MPDU through the WLAN MAC entity 140 at time point T'tx (i.e., the next transmission cycle), wherein the T'tx=Ttx+Δ, and Δ is a positive value bigger than 1 msec. The method includes at least the step of: executing the DL process (step S610) wherein the DL process includes assigning the first WAN MPDU to transport channels corresponding to a WLAN (multiplexing, step S611), converting the first DL WAN MPDU into one (or more) DL WLAN MPDU (adapter processing, step S612), and transmitting the first DL WLAN MPDU through WLAN Physical entity (WLAN MAC/PHY processing, step S613); determining whether a WAN ACK message in response to the first DL WAN MPDU is received before time point T'tx (step S620); if the WAN ACK message in response to the first DL WAN MPDU is received before time point T'tx (step S620, YES), transmitting the second DL WAN MPDU through the WLAN MAC entity 140 at time point T'tx as scheduled (transmitting a new DL WAN MPDU in the next transmission cycle, step S630); if the WAN ACK message in response to the first DL WAN MPDU is not received before time point T'tx (step S620, NO), determining whether a WAN retransmission limit is reached (step S640); if the WAN ACK message in response to the first DL WAN MPDU is not received before time point T'tx and the WAN-retransmission limit is not yet reached (step S640, NO), ignoring to schedule for re-transmitting the first DL WAN MPDU through the first WLAN MAC entity 140 at time point T'tx (i.e., the next transmission cycle) (step S650); if the WAN ACK message in response to the first DL WAN MPDU is not received before time point T'tx, and the WAN retransmission limit of the WAN MAC entity is reached (step S640, YES), transmitting the second DL WAN MPDU toggled with a New Data Indicator (NDI) through the WLAN MAC entity 140 at time point T'tx (transmitting a new DL MAC MPDU toggled with NDI in the next transmission cycle, step S670).

Figure 7:
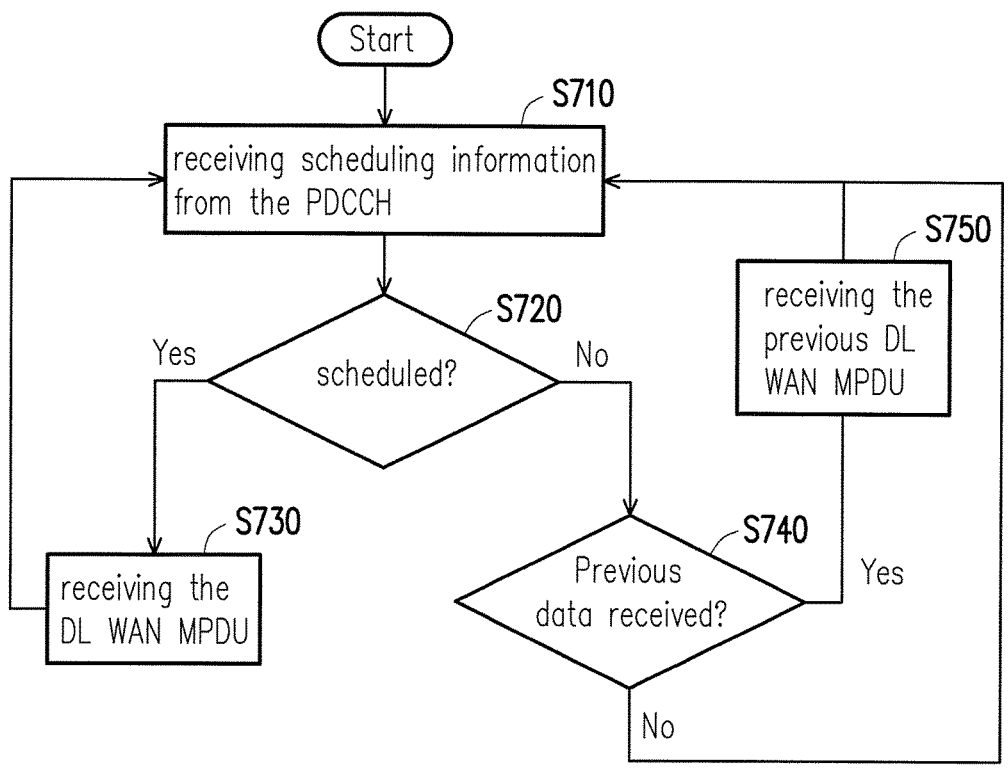
FIG. 7 illustrates a flow chart of method of integrating multiple RATs using CA according to an exemplary embodiment of the present disclosure.

FIG. 7 illustrates a flow chart of method of integrating multiple RATs using CA according to an exemplary embodiment of the present disclosure, wherein the method is configured for a user equipment. Referring to FIG. 7, the method includes but not limited to the step of: receiving scheduling information from the PDCCH (step S710), and determining whether a DL WAN MPDU is received through the WLAN at time point Ttx as scheduled according to the scheduling information (step S720); if the DL WAN MPDU is scheduled to be received through the WLAN at time point Trx according to the scheduling information is deteremined (step S720, YES), for receiving the DL WAN MPDU, controlling the WLAN MAC entity 140 to receive a DL WLAN MPDU coressponding to the DL WAN MPDU(step S730) and receiving scheduling information for the next transmission cycle (step S710); if no DL WAN MPDU is scheduled to be received through the WLAN at time point Trx (step S720, NO), deteremining whether a previous DL WAN MPDU that is scheduled to be received before Trx is received (step S740); if yes, receiving the previous DL WAN MPDU via the WLAN (step S750), and receiving scheduling information for the next transmission cycle (step S710); and if no, receiving scheduling information for the next transmission cycle without wating for any DL WAN MPDU (step S710).

FIG. 8A-8D illustrate time flow chart of four cases based on the timing of the DL WLAN transmission according to exemplary embodiments of the present disclosure, which respectively correspond to case of receiving WLAN ACK before Trx, case of receiving WLAN ACK after Trx, case of retransmission and case of reaching the WAN retransmission limit.

Figure 8A:
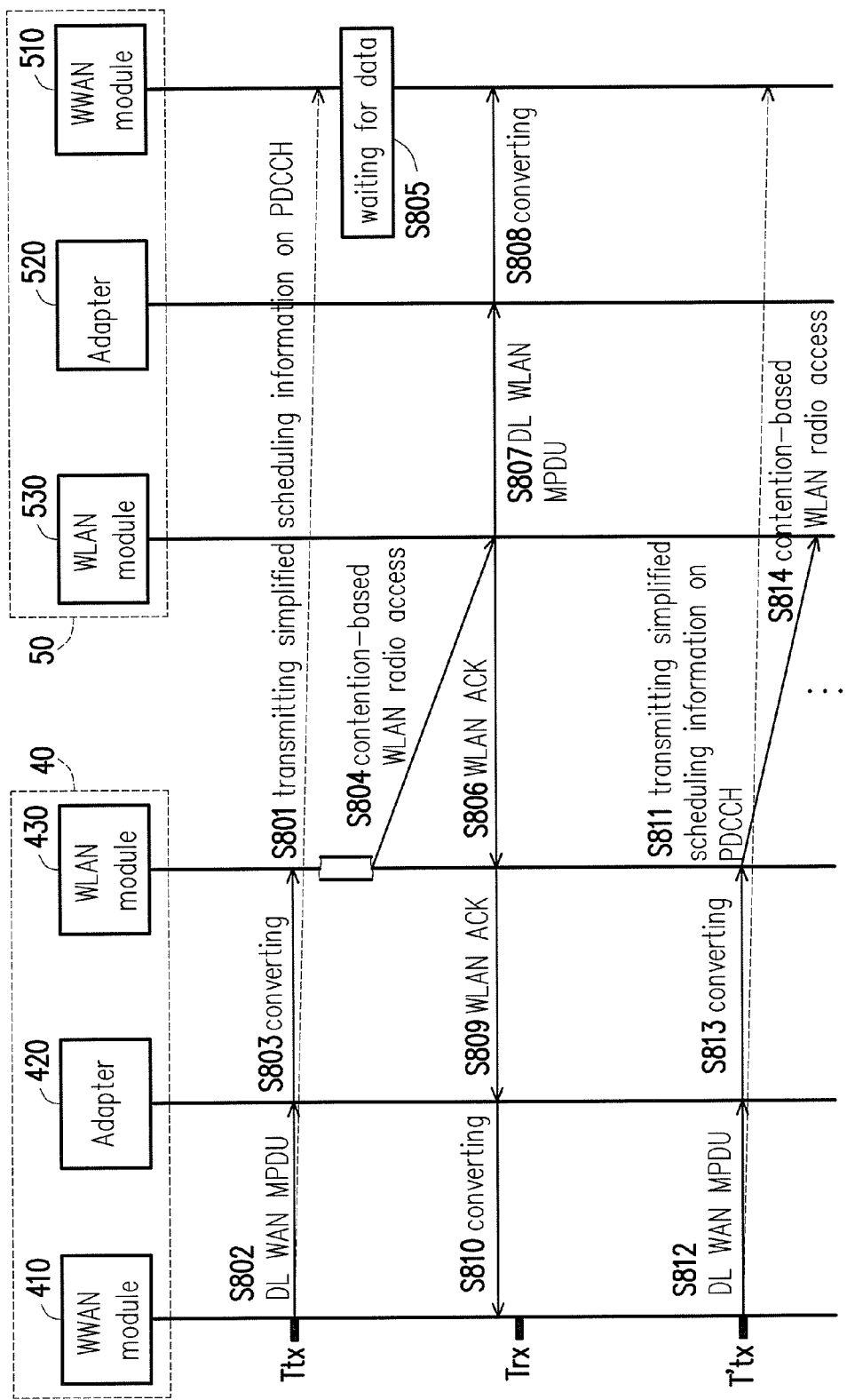
FIG. 8A-8D illustrate time flow chart of four cases based on the timing of the DL WLAN transmission according to exemplary embodiments of the present disclosure.

Referring to FIG. 8A, the exemplary embodiment illustrated in FIG. 8A corresponds to the case of receiving WLAN ACK before Trx. In conventional LTE downlink transmission, the WWAN module 410 of the base station 40 would transmit scheduling information to a UE (e.g., the UE 50) on the PDCCH (Physical Downlink Control Channel) and the data (e.g., DL WAN MPDUs) to the intended UE (e.g., the UE 50) on the PDSCH (Physical Downlink Share Channel). The scheduling information may include time-frequency blocks in which the UE's data is located and the Modulation and Coding Scheme (MCS) used to encode the data so that the UE could verify where to find the intended data in the PDSCH. When one of the LTE component carriers is replaced with a WLAN carrier, as proposed in the present disclosure, the PDSCH is clearly no longer needed as the data will be carried by the WLAN carrier. The data to be transmitted via the PDCCH, on the other hand, could be transmitted through the PDCCH on the primary LTE component carrier when cross-carrier scheduling is utilized (step S801). In this case, the PDCCH in the primary component carrier will not only carry the scheduling information for the primary component carrier, but also some simplified scheduling information for the UE to determine whether a transmission is expected in the component carrier that is replaced by WLAN. The simplified scheduling information may at least include the size of LTE MPDU and NDI.

Continuing on FIG. 8A, if there is a packet to transmit on the WLAN carrier at time point Ttx, the WWAN module 410 would first generate the DL WAN MPDU and transmit the DL WAN MPDU to the adapter 420 (step S802). Then the adapter 420 may then convert DL WAN MPDU into DL WLAN MPDU (step S803). The WLAN module 430 would transmit the DL WLAN MPDU and then the WLAN MPDU would go through the contention-based WLAN radio access (step S804). It is noted that the transmission on the WLAN physical layer of the WLAN module 430 may be delayed a little after time point Ttx so that the UE 50 would have enough time to decode the simplified scheduling information in the PDCCH of the primary LTE component carrier to determine whether a packet (e.g., the DL WLAN MPDU) is expected on the WLAN carrier.

In conventional LTE downlink HARQ, the timing of the transmission of ACK/NACK by the UE 50 must be reached to the base station 40 exactly 4 TTI after the initial transmission. Neglecting the propagation delay, the UE 50 should send an ACK/NACK at Trx=Ttx+4 msec to the base station 40. This ACK/NACK message can be transmitted on the PUCCH (Physical Uplink Control Channel) or PUSCH (Physical Uplink Share Channel) if such uplink resource is allocated to the UE 50. In the case of aggregating a WLAN component carrier, these two physical channels are not available to the WLAN carrier. There may be two alternatives to handle such situation. The first one is to piggy back the PUCCH of the primary component carrier. By this the base station 40 will receive both an ACK/NACK message from WAN MAC entity of the WWAN module 410 and another one from the WLAN module 430. The base station 40 can then determine actions to take based on the combination of the two messages. The second alternative, as described in the FIG. 8A, is to rely solely on the WLAN ACK/NACK.

Unlike LTE's uplink counterpart, the LTE downlink HARQ is asynchronous, that is, the retransmissions may occur at any time after the time an ACK/NACK is expected by the WAN MAC entity in the WWAN module 410 of the base station 40. According to the LTE specification, the WAN MAC entity in the WWAN module 410 expects the reception of an ACK/NACK from the UE at 4 TTI after the transmission of a downlink MAC PDU. Neglecting propagation delay, the UE needs to begin transmitting an ACK/NACK on the PUCCH or PUSCH at time point Trx=Ttx+4 msec. In the case of WLAN carrier, the request for sending such message by the WAN MAC entity at time point Trx will simply be ignored by the adapter 420 if the second alternative mentioned above is adopted. The ACK/NACK of a downlink transmission relies entirely on the WLAN ACK/NACK mechanism. For a regular LTE component carrier, the earliest time point the base station 40 can complete the reception of an ACK/NACK message is Trx+1 msec since the PUCCH or PUSCH may last one TTI long. It is up to the implementation of the base station 40 to determine when the next (re)transmission will take place. We denote the time the base station 40 needs to make such decision to be T'tx=Trx+($\Delta$) msec, where $\Delta$ is a delay parameter bigger than 1 msec that the base station 40 can configure. Finally, the base station 40 may configure the value of $\Delta$ to optimize the throughput of the HARQ process.

Referring to FIG. 8A together with FIG. 4A and 4B, after deriving simplified scheduling information from the PDCCH (step S801), the WAN MAC entity in the WWAN module 510 of the UE 50 may wait for the data (e.g., the WAN MPDU corresponding to the simplified scheduling information) (step S805). It is noted that WWAN module 510 may enable/wake up the WLAN module 530 comprising WLAN MAC entity to receive the DL WLAN MPDU corresponding to the data/packet when it is verified that data/packet would be received via the WLAN. And when the WLAN module 530 receives the DL WLAN MPDU from the base station 40, the WLAN module 530 would then transmit the WLAN ACK message back to the base station 40 in response to the DL WLAN MPDU (step S806). And then, the WLAN module 530 would transmits the DL WLAN MPDU to the adapter 520 (step S807), and the adapter 520 would covert the DL WLAN MPDU into DL WAN MPDU and transmit the DL WAN MPDU to the WWAN module 510 (step S808).

The case shown in FIG. 8A is the simplest case, the base station 40 has a quick and successful transmission in WLAN, which means that the WLAN module 430 of the base station 40 receives a WLAN ACK before time point Trx, which is the time point an base station should receive an ACK/NACK from the WAN MAC entity of an UE in conventional LTE structure. The WLAN module 430 would transmit the WLAN ACK message to the adapter 420 (step 809), and the adapter 420 would covert the WLAN ACK message into the WWAN ACK message, and transmit the WWAN ACK message on (or before) the time point Trx (step S810). It is noted that in the present embodiment, the adapter 420 is not required to transmit the ACK message exactly on the time point Trx as defined in the conventional LTE-CA structure, which allows more timing flexibility in the implementation of the adapter 420 and the WLAN module 430, but the disclosure is not limited thereto. As a result, at time point T'tx (i.e., the next transmission cycle), the base station 40 could schedule a new DL WAN MPDU (e.g., a second DL WAN MPDU) transmission through the WLAN module 430, convert the new DL WAN MPDU into a new DL WLAN MPDU, and transmit the new DL WLAN MPDU though the WLAN (step S811~S814).

Figure 8B:
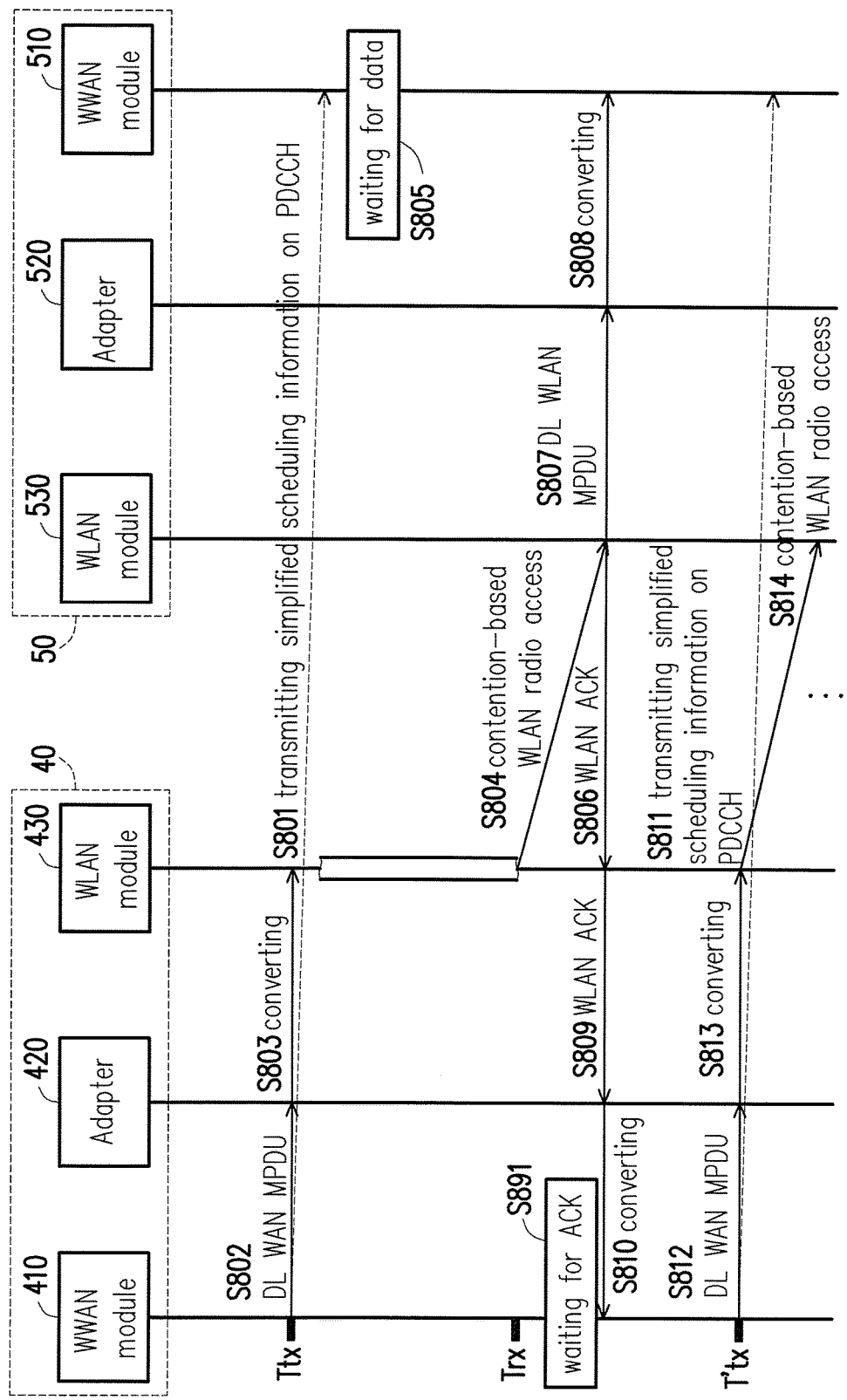

In the present disclosure, the WWAN module 410 may wait for WAN ACK message until the next transmission cycle begins (i.e., waiting for ACK, step S891). The case shown in FIG. 8B is also a successful transmission case, however, the WWAN module 410 receives a delayed WLAN ACK after time point Trx, but still before the next transmission cycle at time point T'tx. As a result, the WWAN module 410 of the base station 40 could still schedule a new DL WAN MPDU transmission at time point T'tx through WLAN module 430. In case shown in FIG. 8B, a long defer access of WLAN which may be caused by temporarily heavy load is illustrated. Perhaps due to a temporarily severe interference, WLAN module 430 itself would try several times of retransmission to complete a successful transmission.

Figure 8C:
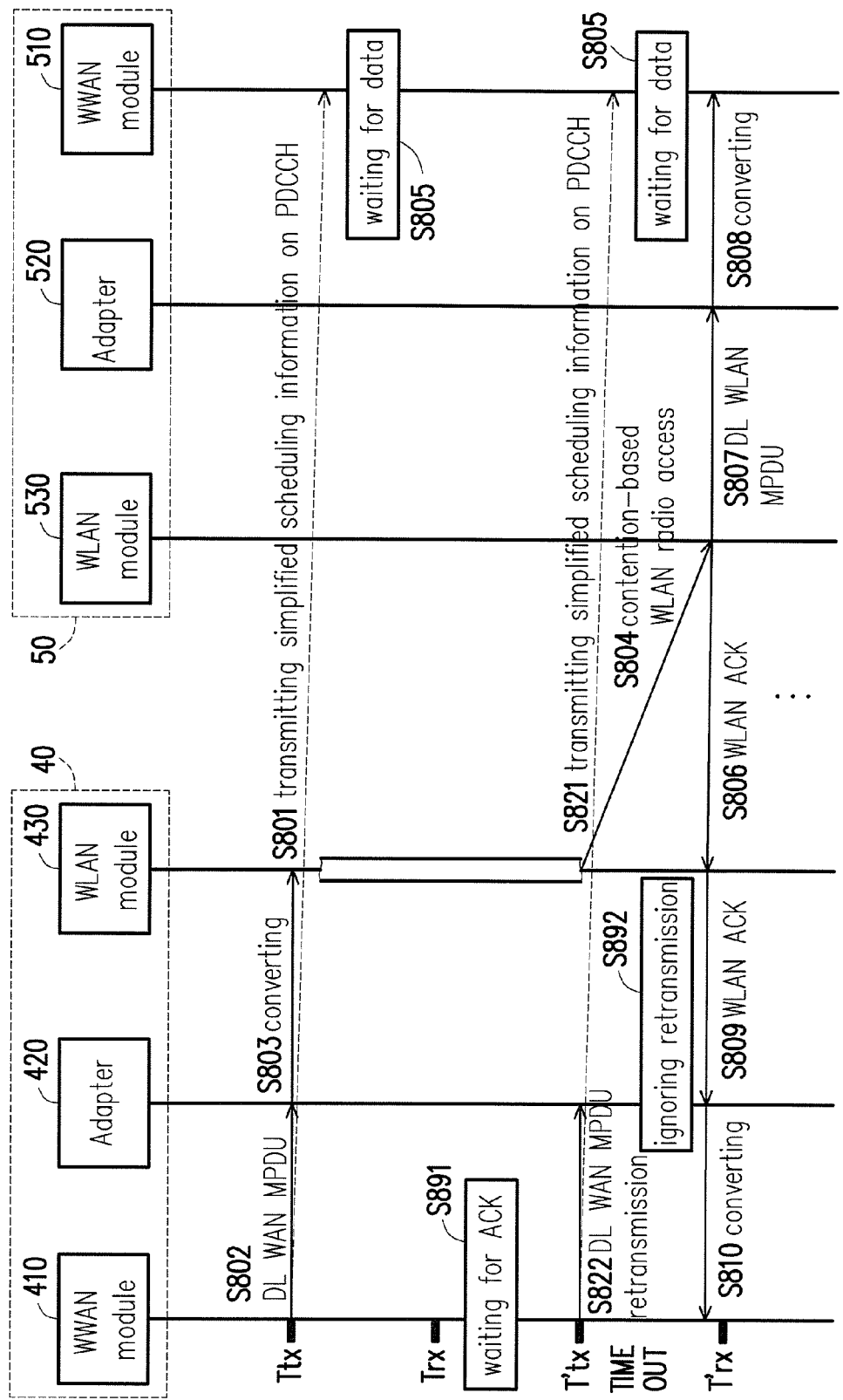

In the case shown in FIG. 8C, the WLAN ACK message arrives base station 40 after time point Ttx (waiting for ACK, TIMEOUT, step S891), the WWAN module 410 in the base station 40 may assume that a NACK is received and a retransmission at time point T'tx would need to be scheduled (step S821, S822). However, the adapter 420 would ignore this retransmission request (step S892), and let the WLAN ARQ run its course.

Figure 8D:
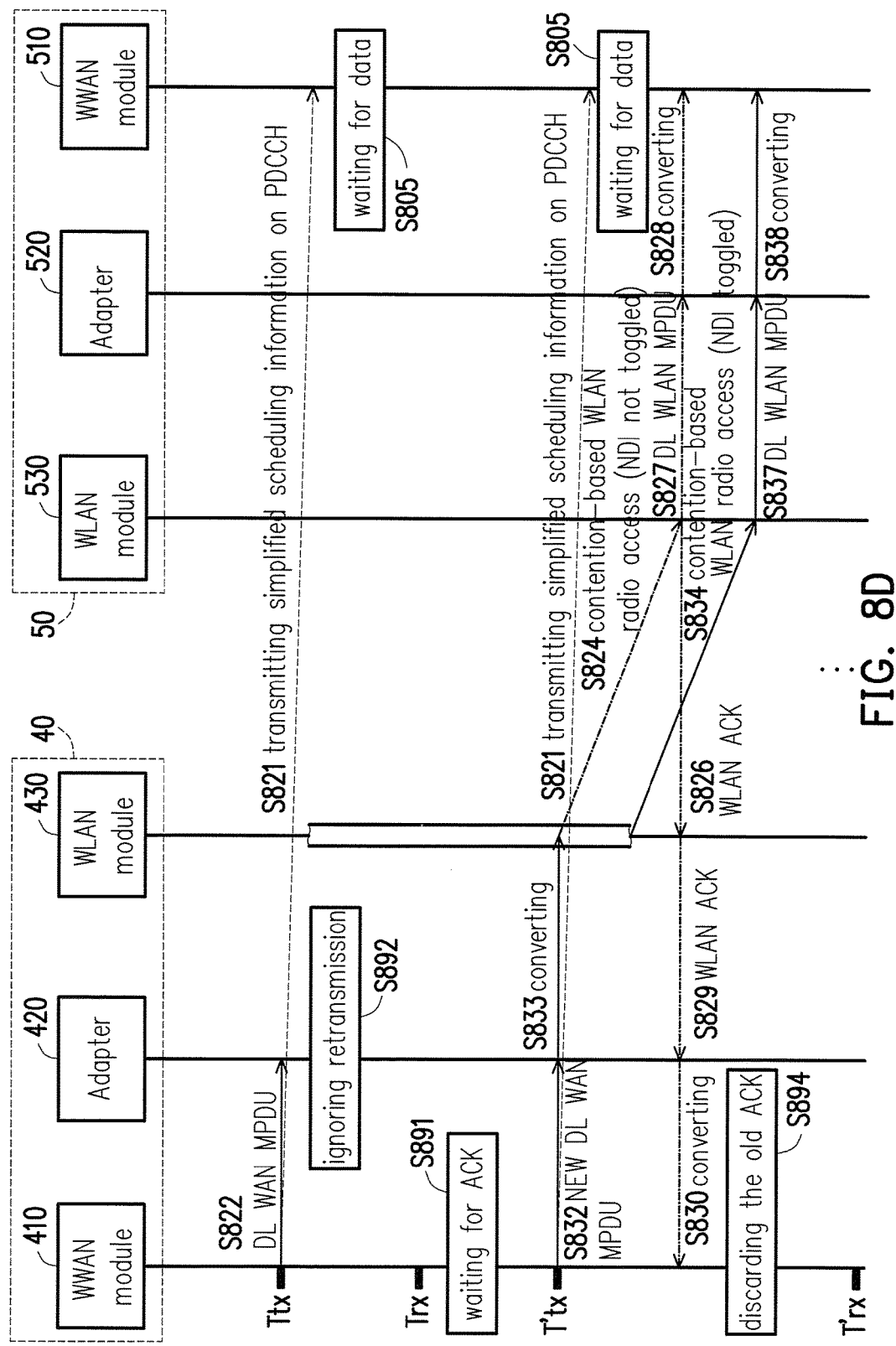

In case shown in FIG. 8D, if the base station 40 still does not receive a WLAN ACK before time point T'tx, and the WAN retransmission limit is reached (step S892), the WWAN module 410 would schedule a new DL WAN MPDU (with NDI toggled) (step S832) and the adapter 420 would convert the new DL WAN MPDU to DL WLAN MPDU (step S833). In this case, since the new DL WAN MPDU (with NDI toggled) is being transmitted, the WAN MAC entity of the WWAN module 410 would discard the old ACK corresponding to the previous DL WAN MPDU (step S894). And the retransmission mechanism of this previous DL WAN MPDU would be held by the protocol entities upper than the WAN MAC entity in the protocol stack of the WWAN module 410, such as RLC entity, etc..

Two enhancements for the WLAN transmission would be described herein. First is that when WAN retransmission limit is reached, the transmission procedure of this DL WAN MPDU could be stopped, i.e., this DL WAN MPDU is dropped in the WLAN module 430 of the base station 40. The second enhancement is to dynamically tune the retransmission limit of IEEE 802.11 MAC protocol for networked control systems. For example, dynamically configure the parameters, RTSThreshold, ShortRetryLimit, and LongRetryLimit.

Figure 9:
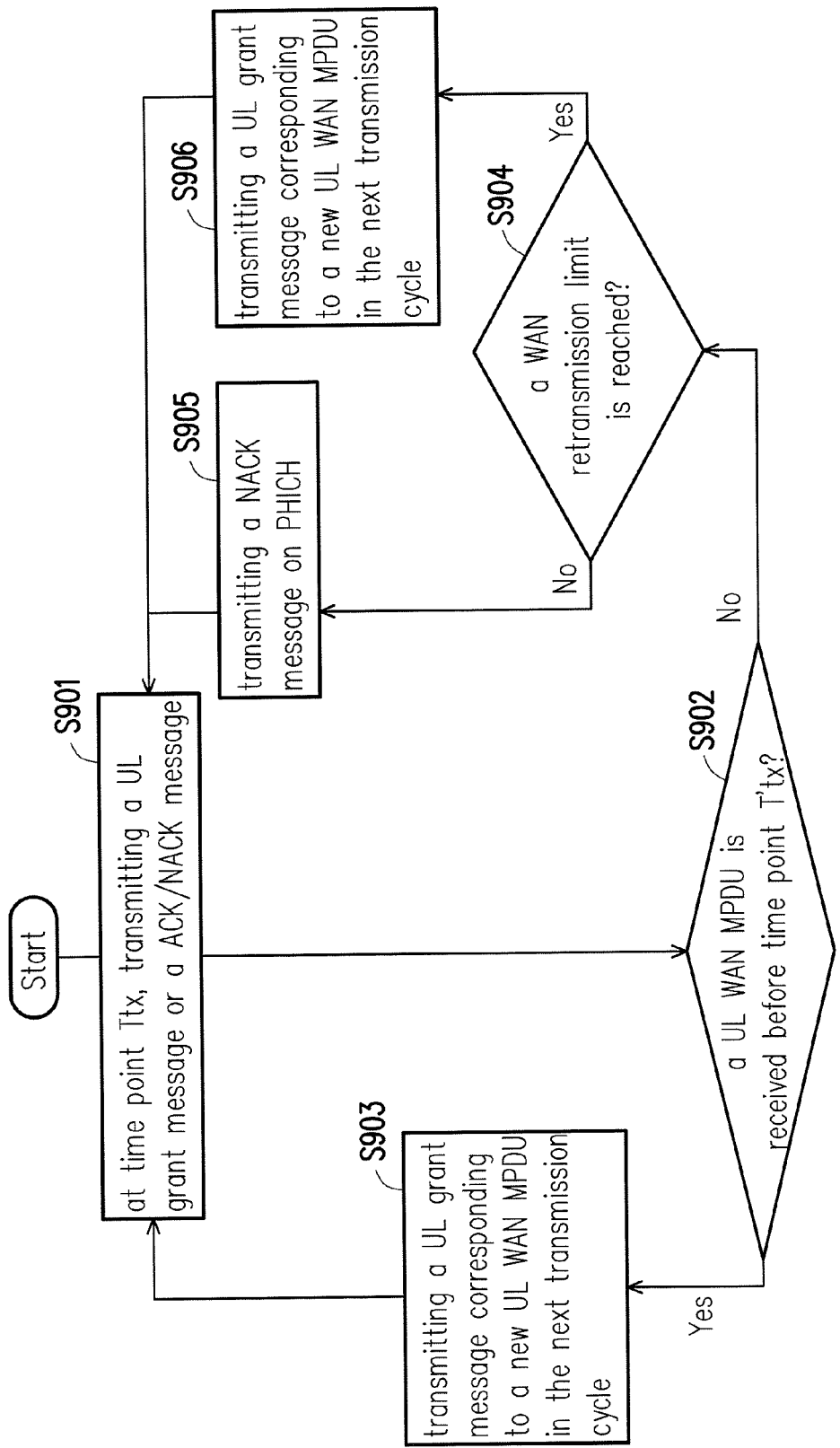
FIG. 9 illustrates a flow chart of the method of integrating multiple RATs using CA according to an exemplary embodiment of the present disclosure.

FIG. 9 illustrates a flow chart of the method of integrating multiple RATs using CA according to an exemplary embodiment of the present disclosure, wherein the method is configured for a base station (e.g., base station 40 in FIG. 4A) to transmit data in an uplink path. Referring to FIG. 9, the method includes but not limited to the step of: at time point Ttx, transmitting a UL grant message (which may correpond to a first UL WAN MPDU) through a PDCCH from a primary Component Carrier (CC) or transmitting a ACK/NACK message (e.g., via WLAN module 430 of the base station 40) corresponding to a previous UL WAN MPDU (step S901); determining whether the UL WAN MPDU in response to the first UL grant message (e.g, the first UL WAN MPDU) is received before time point T'tx, wherein the T'tx=Ttx+Δ, and Δ is a positive value bigger than 1 msec (step S902); if the UL WAN MPDU is received through a WLAN MAC entity of the base station before time point T'tx (step S902, YES), transmitting a second UL grant message correponding to a second UL WAN MPDU (i.e., the next UL WAN MPDU at next transmission cycle) (step S903, It is noted that at the step S903, the base station 40 could also set TX message as null for semi-persistent scheduling); if the UL WAN MPDU is not received through a WLAN MAC entity of the base station before time point T'tx (step S902, NO), deteremining whether a WAN retransmission limit is reached (step S904); if the WAN MPDU is not received before time point T'tx and a WAN retransmission limit is not reached (step S904, NO), transmitting a NACK message on PHICH from the primary CC (step S905); if the UL WAN MPDU is not received (e.g., through the adapter 420) before time point T'tx and the WAN retransmission limit is reached (step S904, YES), transmitting the second UL grant message for a new UL WAN MPDU (step S906).

Figure 10:
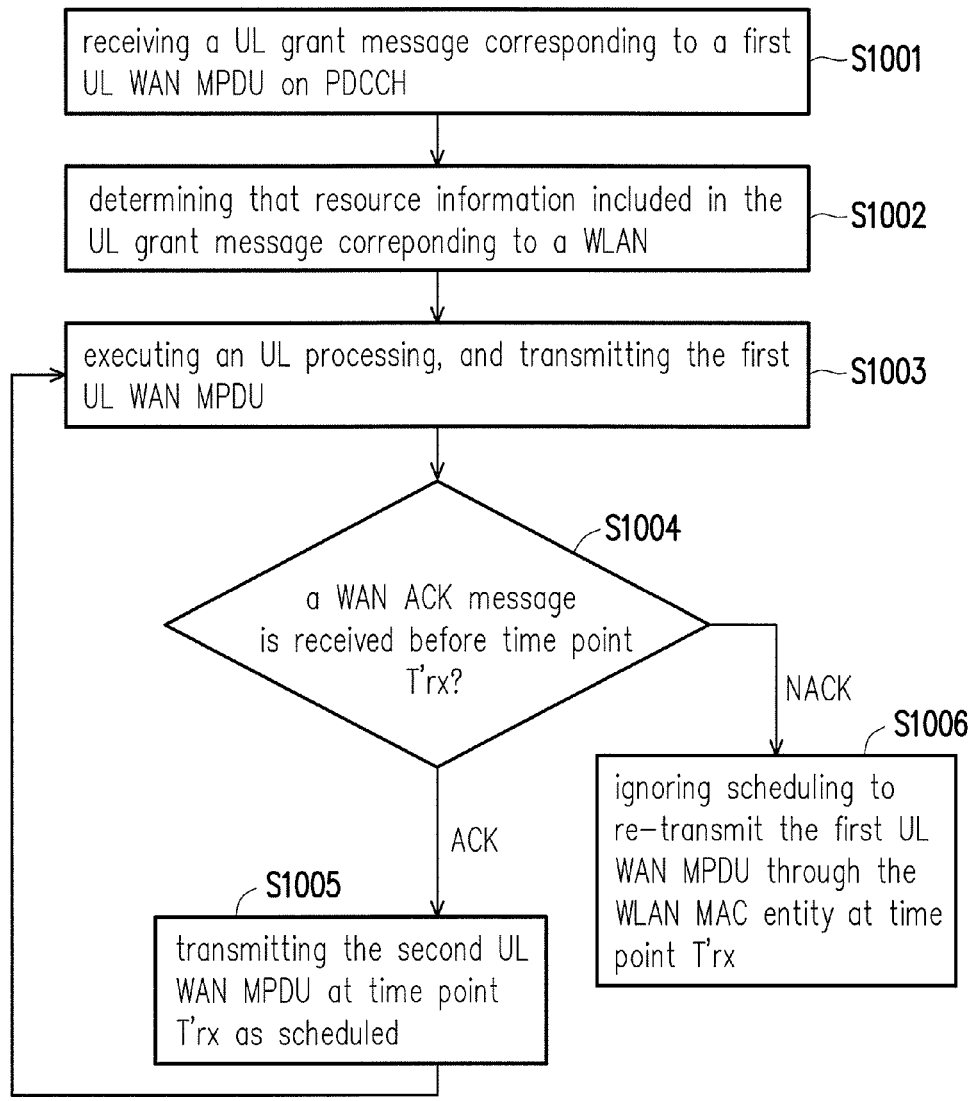
FIG. 10 illustrates a flow chart of the method of integrating multiple RATs using CA according to an exemplary embodiment of the present disclosure.

FIG. 10 illustrates a flow chart of the method of integrating multiple RATs using CA according to an exemplary embodiment of the present disclosure, wherein the method is configured for a UE (e.g., the UE 50 in FIG. 4B) to transmit data in an uplink path. Referring to FIG. 10, assuming that the WAN MAC entity of the UE schedules to transmit the first UL WAN MPDU through a WLAN MAC entity (e.g., WLAN MAC entity included in the WLAN module 530 shown in FIG. 4B) at time point Trx (i.e., the current cycle), and schedules to transmit the second DL WAN MPDU through the WLAN MAC entity at time point T'rx (i.e., the next transmission cycle), wherein the T'rx=Trx+C, and C is a positive constant value bigger than 1 msec. The method includes but not limited to the step of: receiving a UL grant message corresponding to a first UL WAN MPDU on PDCCH (step S1001); determining whether resource information included in the UL grant message correponding to a WLAN (step S1002); when the resource information correponding to the WLAN is determined, executing an UL processing, and transmitting the first UL WAN MPDU through a WLAN MAC entity of the UE (step S1003); determining whether a WAN ACK message in response to the first UL WAN MPDU is received through the the WLAN MAC entity before time point T'rx (step S1004); if the WAN ACK message in response to the first UL WAN MPDU is received before time point T'rx (step S1004, ACK), transmitting the second UL WAN MPDU at time point T'rx as scheduled (step S1005); if the WAN ACK message in response to the first UL WAN MPDU is not received before time point T'rx or a NACK in response to the first UL WAN MPDU is received via PHICH (step S1004, NACK), ignoring scheduling to re-transmit the first UL WAN MPDU through the WLAN MAC entity at time point T'rx (step S1006). It is noted that the UL process mentioned in step S1003 is similar to the DL processing described in the embodiement shown in FIG. 6, including steps of converting a UL WAN MPDU into a UL WLAN MPDU, further details of the UL processing could refer to step S610 in FIG. 6.

FIG. 11A-11D illustrate time flow chart of four cases based on the timing of the UL WLAN transmission according to exemplary embodiments of the present disclosure, which respectively correspond to case of receiving WLAN ACK before Trx, case of receiving WLAN ACK after Trx, case of retransmission and case of reaching the WAN retransmission limit.

Figure 11A:
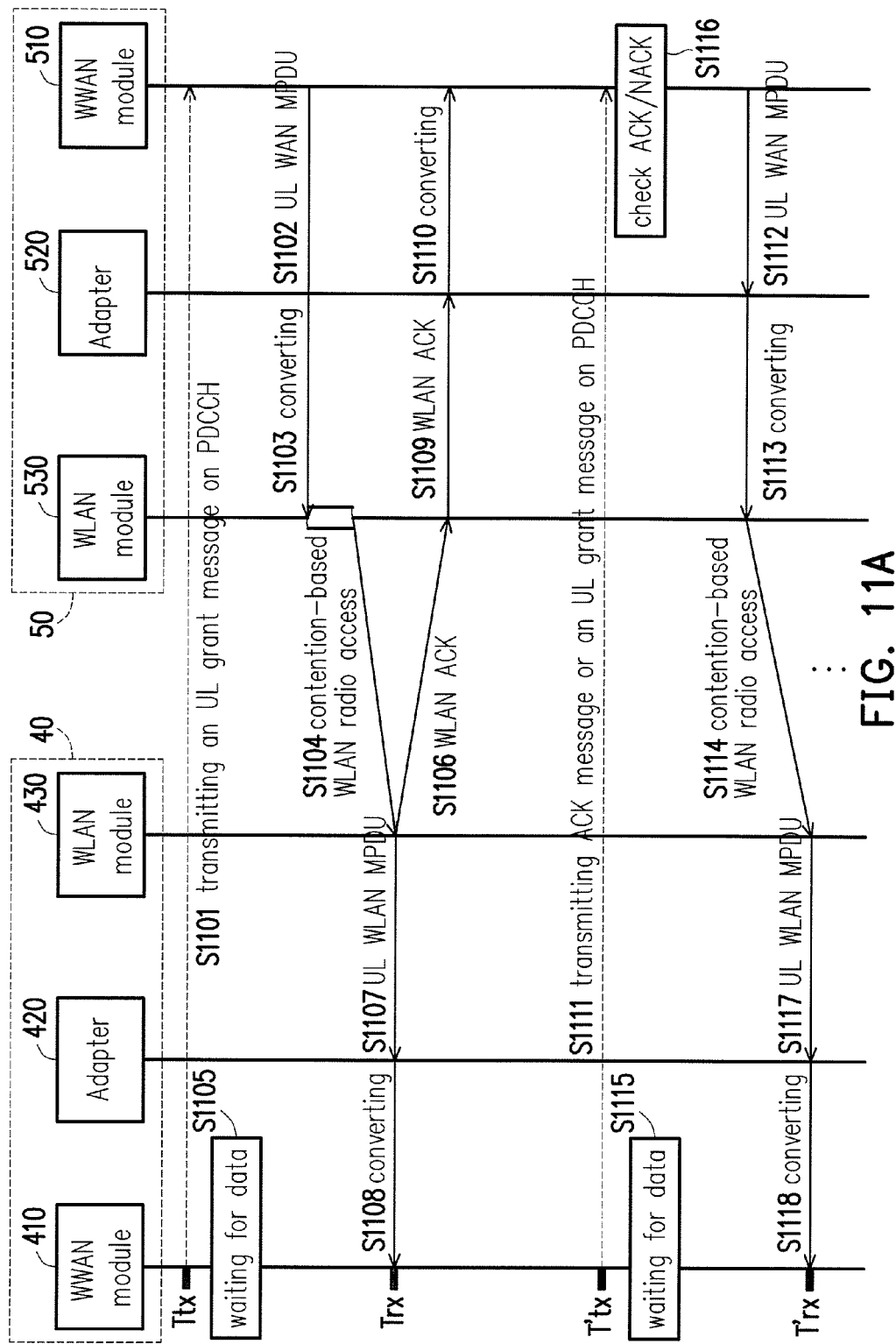

Referring to FIG. 11A together with FIG. 4A and 4B, contrary to the counterpart of uplink transmission, i.e., the transmission in the downlink path, the LTE uplink HARQ is synchronous and controlled by the eNB (e.g., the base station 40 shown in FIG. 4A). When a UE (e.g., the UE 50 shown in FIG. 4B) attempts to transmit uplink data, the UE 50 may first send a Scheduling Request (SR, not shown)

asking the base station 40 to allocate uplink radio resource for the transmission. If such resource is available, the base station 40 then sends an uplink grant message at time Ttx in the LTE downlink control channel (PDCCH), which would be continuously monitored by the UE 50, as the step S1101 shown by the dashed arrow. The UE 50 is required to transmit the first Transport Block (i.e., the first UL WAN MPDU) that will begin to reach the base station 40 at time point Trx=Ttx+4 msec, which is 4 TTIs (e.g., the value C is set as 4 msec) after time point Ttx. It is noted that for simplicity and clarity, the propagation delay is omitted herein. After receiving the uplink data (e.g., receiving the first UL WLAN MPDU at step S1107, and converting the first ULWLAN MPDU into the first UL WAN MPDU at step S1108), the base station 40 would then attempt to decode the data packet corresponding to the first UL WAN MPDU and send an ACK/NACK message accordingly at time point T'tx=Trx+4 msec=Ttx+8 msec (step S1106). The above-described timing periods are explicitly specified and known to the UE 50. Therefore, no additional signaling overhead is required to inform the UE of when to expect the ACK/NACK message. The process continues at an 8-TTI interval for the subsequent uplink (re)transmission.

Similar to the downlink transmission, upon the reception of the uplink grant message with resource information corresponding to the WLAN (step S1101), the WWAN module 510 of the UE 50 would transmit the first UL WAN MPDU to the adapter 520 (step S1102), and the adapter 520 of the UE 50 would convert the first UL WAN MPDU into the first UL WLAN MPDU and transmit the first UL WLAN MPDU to the WLAN module 530 (step 1103). The WLAN MAC entity in the WLAN module 530 of the UE 50 may immediately begin the uplink transmission on the physical layer of WLAN module 530. It is noted that the WLAN module 530 would not wait until time point Trx (minus propagation delay) as transmitting the UL WAN MPDU using one of the LTE component carrier, by this the contention-based WLAN could be allowed having more time to complete the uplink reception at the base station 40 before the time point Trx. Once the contention-based WLAN access is initiated, the actual data transmission and MAC layer ARQ will be carried out entirely by WLAN (step S1104). If the UE 50 receives a WLAN MAC NACK message or times out, the adapter 520 will take no action and the packet would be re-transmitted by the WLAN module 530 on WLAN until a WLAN ACK is received, more details of this case would be described later in this disclosure.

On the other side, when the WLAN MAC/PHY entity of the WLAN module 430 of the base station 40 receives a packet (e.g., the first UL WLAN MPUD) via WLAN, the WLAN module 430 would send a WLAN ACK message back to the UE 50 (step S1106) and deliver the first UL WLAN MPDU to the adapter 420 of the base station 40 (step S1107), which would then convert the first UL WLAN MPDU to the first UL WAN MPDU (step S1108). Also, the WWAN module 410 of the base station 40 would wait for data after sending out the UL grant message (step S1115), if the successful reception of an LTE MPDU (e.g., receiving the first UL WAN MPDU from the adapter 420) occurs before time point T'tx=Ttx+8 msec, the WAN MAC entity of the WWAN module 410 in the base station 40 would send an ACK message on the LTE Physical HARQ Indication Channel (PHICH). Otherwise, a NACK message is sent instead. WAN MAC entity of the WWAN module 410 may also send another UL Grant message on the PDCCH (e.g., the PDCCH on the primary CC) if dynamic cross-carrier scheduling is employed (step S1111). As a result, the UE 50 may first receive a ACK message through the WLAN (e.g., receiving a WLAN ACK message from the WLAN at step S1106 and step S1109, and converting the WLAN ACK message into the ACK message at step S1110), and the another ACK message directly though the LTE (step S1115).

The case shown in FIG. 11A would be the simplest one, in the case shown in FIG. 11A, the first UL WAN MPDU is successfully received by the base station 40 before time point Trx (step S1108) and both the WLAN ACK message and WAN ACK message are received by the UE 50 before time point T'tx (step S1109, S1116). In this case, the UE 50 would transmit the next packet in the queue (i.e., the second UL WAN MPDU) following the same steps as the first transmission (i.e., the steps S1112-S1114, S1119-S1120).

Figure 11B:
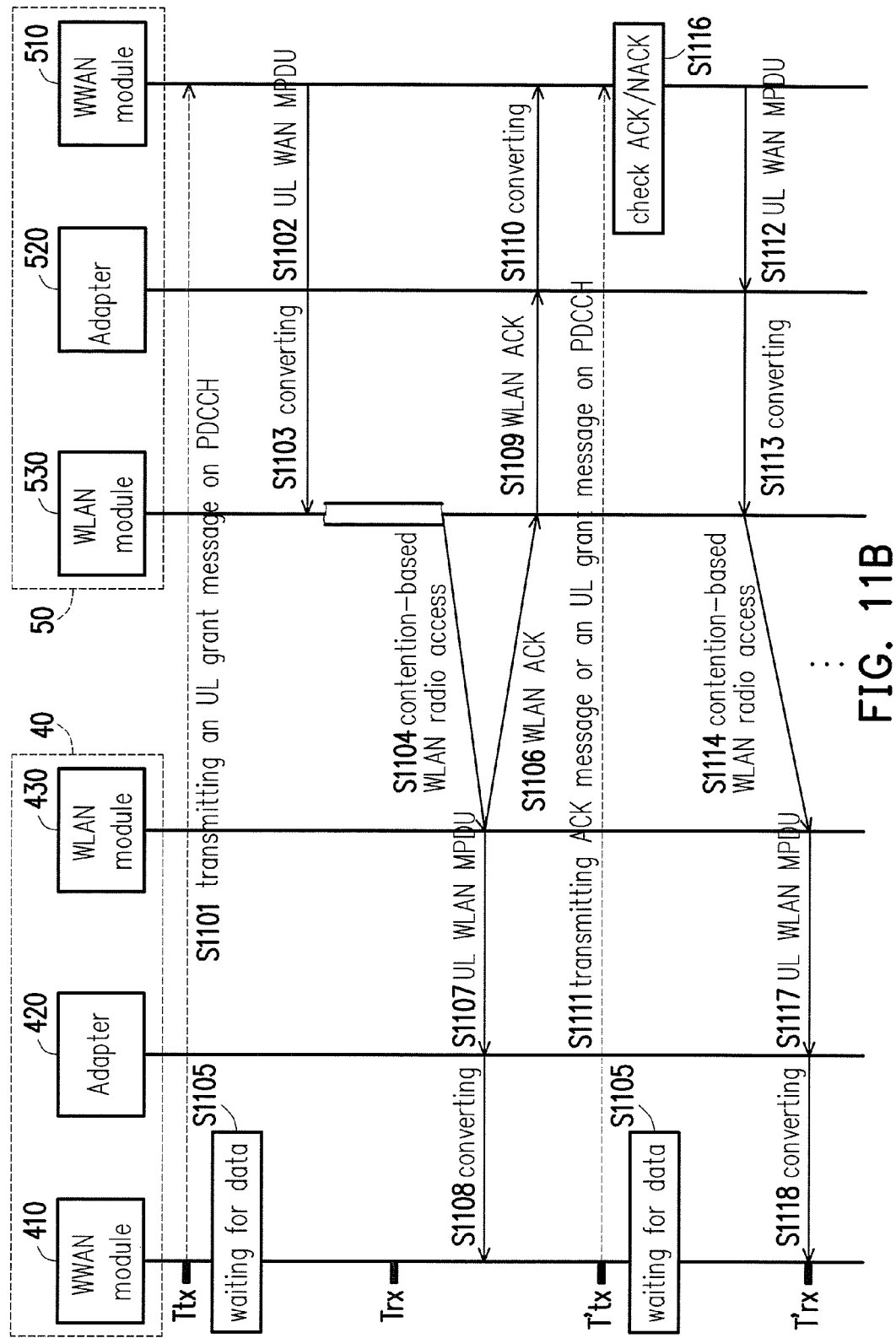

The case shown in FIG. 11B is also a successful transmission case, however, the WLAN module 430 of the base station 40 receives the delayed first UL WLAN MPDU after time point Trx, but still before the next transmission cycle starts, i.e., the time point T'tx, so the base station 40 sends an ACK message on the LTE PHICH and also send another UL Grant message on PDCCH in the embodiment shown in FIG. 11B (step S1111).

Figure 11C:
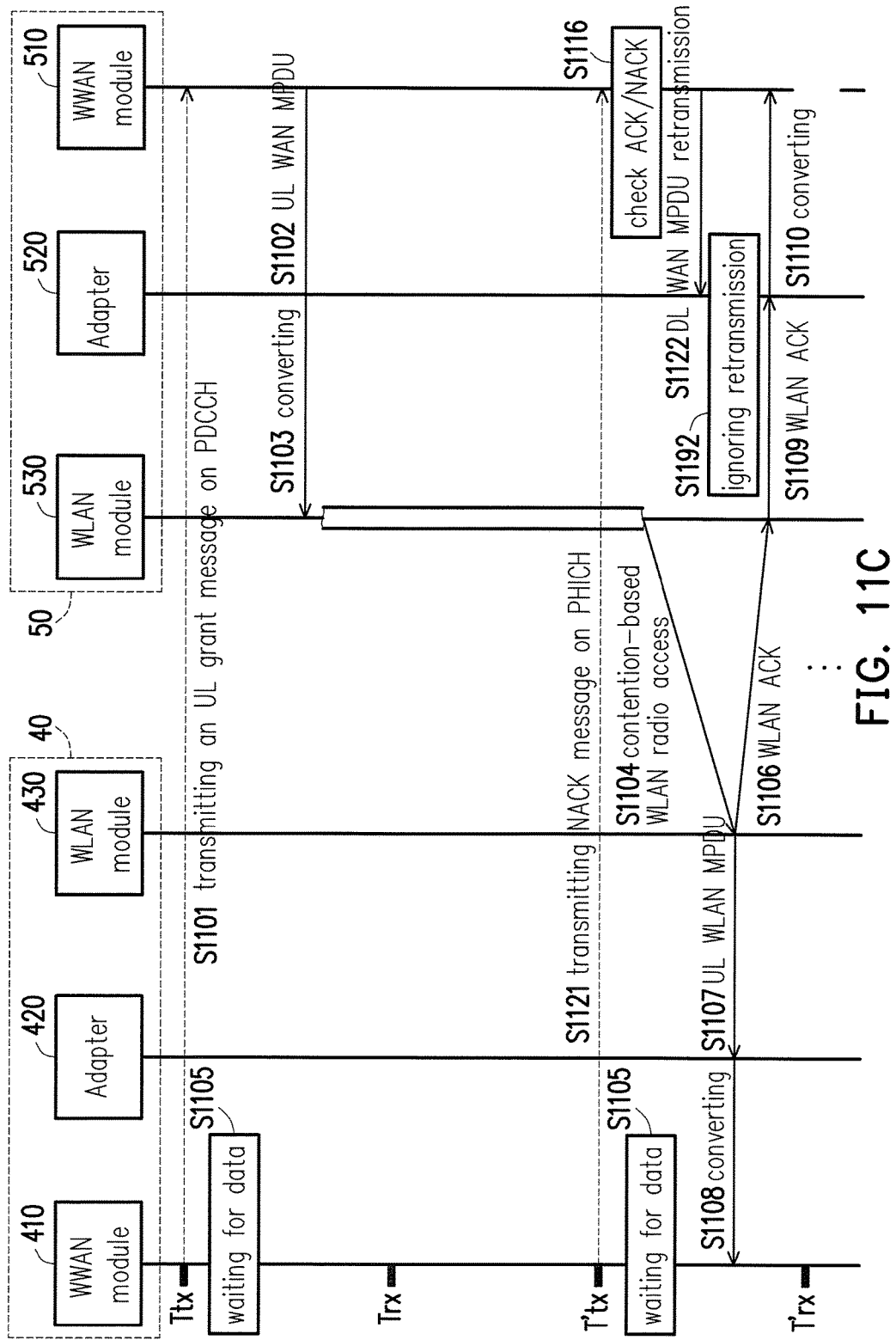

In the case shown in FIG. 11C, the WWAN module 410 of the base station 40 does not receive a LTE MPDU before time point T'tx, so the WWAN module 410 would send a NACK message on the LTE PHICH to request the UE 50 for a retransmission(step S1121). The WWAN module 510 of the UE 50 would then schedule a retransmission (step S1122) after receiving the NACK message is determined (step S1116). However, the adapter 520 of the UE 50 would ignore this retransmission request (step S1192) and let the WLAN ARQ of the WLAN module 530 run its course (from step S1103 to step S1104 and S1106).

The case shown in FIG. 11D illustrates the case of the WAN retransmission limit is reached. If the base station 40 still does not receive a WLAN frame (e.g., the first UL WAN MPDU) before time point T'tx, and the WAN retransmission limit is reached (step S1193), the WWAN module 410 of the base station 40 would send an UL grant message on PDCCH with NDI toggled (step S1131), i.e., requesting for the next DL WAN MPDU. The WWAN module 510 of the UE 50 would then schedules to transmit a new WAN MPDU (e.g., the second UL WAN MPDU with NDI toggled) after receiving the UL grant message (step S1132) and the adapter 520 would converts the new UL WAN MPDU into a WLAN frame (e.g., the second UL WLAN MPDU) (step S1133). The new UL WAN MPDU would be transmitted to the WLAN though the WLAN MAC/PHY entity of the WLAN module 530 (step S1124). It is noted that if the WAN ACK message corresponding to the old UL WAN MPDU is received, e.g., upon the reception of a WLAN ACK message by the WLAN module 530 and a conversion by the adapter 520 (step S1129, S1130), the WWAN module 510 of the UE 50 would be discarded since the transmission corresponding to the new UL WAN MPDU have been initiated (step S1194).

Two enhancements for preventing the timing issue of the uplink WLAN transmission described above would be described herein. First is that when LTE retransmission limit is reached, the transmission procedure of this UL WAN MPDU is stopped. In other words, i.e., this UL WAN MPDU is dropped in the WLAN module 530 of the UE 50, and this enhancement could be implemented by sending a notification message, from the base station 40 to the UE 50, through PDCCH (together with the UL grant message or not). The second enhancement is to dynamically tune the retransmission limit of IEEE 802.11 MAC protocol for networked control systems. For example, dynamically configure the parameters, RTSThreshold, ShortRetryLimit, and LongRetryLimit, which is not limited thereto.

In view of the aforementioned descriptions, the present disclosure provides a base station, a UE for integrating multiple RATs using CA (e.g., WWAN and WLAN) and method thereof, by integrating multiple RATs under the MAC layer (i.e., the MAC entity) of one of the RATs (e.g., under the MAC layer of the LTE-CA) which allows the higher protocol layers remain intact. Also, since the integration is made under the MAC protocol, the contention-based WLAN access could be scheduled with LTE-CA access, the radio resource of the unlicensed spectrum could be more efficiently utilized.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A base station, for integrating multiple Radio Access Technologies (RATs) using Carrier Aggregation (CA), comprising:
   a Wide Area Network (WAN) processing circuit which is related to a cellular network, and the WAN processing circuit comprises:
     a scheduler, assigns a plurality of Downlink (DL) WAN Media Access Control (MAC) Protocol Data Units (MPDUs) to a plurality of transport channels;
     a plurality of Hybrid Automatic Repeat request (HARQ) buffers, connected to the scheduler and each of the HARQ buffers respectively connects to one of the transport channels, wherein each of the HARQ buffers stores part of the DL WAN MPDUs; and
     a multiplexer, coupled to the scheduler, connected between the scheduler and the HARQ buffers, the multiplexer distributes the DL WAN MPDUs to the HARQ buffers according to the assignation from the scheduler;
   a first adapter, connected to a first HARQ buffer of the HARQ buffers, receives the DL WAN MPDUs stored in the first HARQ buffer, comprises a plurality of HARQ process IDs corresponding to a plurality of process queues in the HARQ buffer connected to the first adapter and a mapping table comprising a WLAN MAC address and a Cell Radio Network Temporary Identifier (C-RNTI) of each of a plurality of User Equipments (UEs) in a radio coverage of the base station, converts the DL WAN MPDUs into a plurality of DL Wireless Local Area Network (WLAN) MPDUs according to the mapping table, and appends one of the HARQ process IDs in a header of each of DL WLAN MPDUs correspondingly, wherein the DL WLAN MPDUs are 802.11 MAC frames, and the DL WAN MPDUs are cellular based MAC frame; and
   a first WLAN processing circuit which is related to the WLAN, coupled to the first adapter, receives the DL WLAN MPDUs,
   wherein the WAN processing circuit respectively transmits the DL WAN MPDUs through the transport channels, and the first WLAN processing circuit transmits the DL WLAN MPDUs to be time-aligned with the DL WAN MPDUs.

2. The base station as claimed in claim 1, wherein the base station further comprises:
   a second adapter, connected to a second HARQ buffer of the HARQ buffers, receives the DL WAN MPDUs stored in the second HARQ buffer, and converts the DL WAN MPDUs into the DL WLAN MPDUs; and
   a second WLAN processing circuit, coupled to the second adapter, receives the DL WLAN MPDUs,
   wherein the WAN processing circuit respectively transmits the DL WAN MPDUs through the transport channels, and the first WLAN processing circuit and the second WLAN processing circuit transmit the DL WLAN MPDUs to be time-aligned with the DL WAN MPDUs.

3. The base station as claimed in claim 1, wherein
   the DL WAN MPDUs comprises a first DL WAN MPDU and a second DL WAN MPDU, wherein the scheduler of the WAN processing circuit schedules to transmit the first DL WAN MPDU through the first WLAN processing circuit at time point Ttx, and schedules to transmit the second DL WAN MPDU through the first WLAN processing circuit at time point T'tx, wherein the T'tx=Ttx+$\Delta$, and $\Delta$ is a positive value bigger than 1 msec;
   the WAN processing circuit determines whether a WAN ACK message in response to the first DL WAN MPDU is received through the first adapter before time point T'tx; and
   if the WAN ACK message in response to the first DL WAN MPDU is received through the first adapter before time point T'tx, the scheduler transmits the second DL WAN MPDU through the first WLAN processing circuit at time point T'tx as scheduled.

4. The base station as claimed in claim 3, wherein
   the first WLAN processing circuit receives a WLAN ACK message in response to the first DL WAN MPDU, and transmits the WLAN ACK message to the first adapter; and
   the first adapter converts the WLAN ACK message into the WAN ACK message.

5. The base station as claimed in claim 3, wherein
   if the WAN ACK message in response to the first DL WAN MPDU is not received through the first adapter before time point T'tx, the scheduler schedules to re-transmit the first DL WAN MPDU through the first WLAN processing circuit at time point T'tx; and
   the first adapter ignores the re-transmitted first DL WAN MPDU when receiving the re-transmitted first DL WAN MPDU.

6. The base station as claimed in claim 3, wherein
if the WAN ACK message in response to the first DL WAN MPDU is not received through the first adapter before time point T'tx and a WAN retransmission limit of the WAN processing circuit is reached, the scheduler transmits the second DL WAN MPDU toggled with a New Data Indicator (NDI) through the first WLAN processing circuit at time point T'tx.

7. The base station as claimed in claim 1, wherein
when the size of one of the WAN MPDUs is larger than the size of a frame body of a 802.11 MAC frame, the first adapter fragments the WAN MPDU into several WLAN MPDUs during conversion.

8. The base station as claimed in claim 1, wherein
at time point Ttx, the WAN processing circuit transmits a first uplink (UL) grant message through a Physical Downlink Control Channel (PDCCH) from a primary Component Carrier (CC), and the scheduler of the WAN processing circuit determines whether a UL WAN MPDU in response to the first UL grant message is received through the first adapter before time point T'tx, wherein the T'tx=Ttx+Δ, and Δ is a positive value bigger than 1 msec; and
if the UL WAN MPDU is received through the first adapter before time point T'tx, the WAN processing circuit transmits a second UL grant message.

9. The base station as claimed in claim 8, wherein
if the UL WAN MPDU is not received through the first adapter before time point T'tx and a WAN retransmission limit is not reached, the WAN processing circuit transmits a NACK message on PHICH from the primary CC; and
if the UL WAN MPDU is not received through the first adapter before time point T'tx and the WAN retransmission limit is reached, the WAN processing circuit transmits the UL grant message.

10. The base station as claimed in claim 8, wherein
the WLAN processing circuit receives a UL WLAN MPDU, and transmits a WLAN ACK message in response to the UL WLAN MPDU; and
the first adapter receives the UL WLAN MPDU from the WLAN processing circuit, coverts the UL WLAN MPDU into the UL WAN MPDU, and transmits the UL WAN MPDU to the WAN processing circuit.

11. A method of integrating multiple Radio Access Technologies (RATs) using Carrier Aggregation, for a base station to transmit data in a downlink path, comprising:
assigning, by a WAN processing circuit of the base station, a plurality of Downlink (DL) WAN MAC Protocol Data Units (MPDUs) to a plurality of transport channels, wherein the WAN processing circuit is related to a cellular network;
converting, by an adapter of the base station, the DL WAN MPDUs corresponding to one of the transport channels into a plurality of DL WLAN MPDUs according to a mapping table, and appending, by the adapter, one of the HARQ process IDs in a header of each of DL WLAN MPDUs correspondingly, wherein the DL WLAN MPDUs are 802.11 MAC frames, the DL WAN MPDUs are cellular based MAC frame, and the mapping table comprises a WLAN MAC address and a Cell Radio Network Temporary Identifier (C-RNTI) of each of a plurality of User Equipments (UEs) in a radio coverage of the base station; and
transmitting, by the WAN processing circuit, the DL WAN MPDUs through the transport channels, and transmitting, by a WLAN processing circuit of the base station, the DL WLAN MPDUs to be time-aligned with the DL WAN MPDUs, wherein the WLAN processing circuit is related to the WLAN.

12. The method as claimed in claim 11, wherein the DL WAN MPDUs comprises a first DL WAN MPDU and a second DL WAN MPDU and the step of transmitting the DL WLAN MPDUs to be time-aligned with the DL WAN MPDUs comprising:
scheduling, by the WAN processing circuit, to transmit the first DL WAN MPDU through the WLAN processing circuit of the base station at tune point Ttx, and scheduling, by the WAN processing circuit, to transmit the second DL WAN MPDU through the WLAN processing circuit at time point T'tx, wherein the T'tx=Ttx+Δ, and Δ is a positive value bigger than 1 msec; and
determining, by the WAN processing circuit, whether a WAN ACK message in response to the first DL WAN MPDU is received before time point T'tx, and if the WAN ACK message in response to the first DL WAN MPDU is received before time point T'tx, transmitting the second DL WAN MPDU through a first WLAN processing circuit at time point T'tx as scheduled.

13. The method as claimed in claim 12, wherein before the step of determining whether the WAN ACK message in response to the first DL WAN MPDU is received, the method further comprising:
receiving, by the WLAN processing circuit, a WLAN ACK message in response to first DL WAN MPDU, and converting, by the adapter, the WLAN ACK message into the WAN ACK message.

14. The method as claimed in claim 12, wherein the step of determining whether the WAN ACK message in response to the first DL WAN MPDU is received before time point T'tx further comprising:
if the WAN ACK message in response to the first DL WAN MPDU is not received before time point T'tx, ignoring to schedule for re-transmitting the first DL WAN MPDU through the first WLAN processing circuit at time point T'tx.

15. The method as claimed in claim 12, wherein the step of determining whether the WAN ACK message in response to the first DL WAN MPDU is received before time point T'tx further comprising:
if the WAN ACK message in response to the first DL WAN MPDU is not received through a first adapter before time point T'tx and a WAN retransmission limit of the WAN processing circuit is reached, transmitting the second DL WAN MPDU toggled with a New Data Indicator (NDI) through the WLAN processing circuit at time point T'tx.

16. The method as claimed in claim 11, wherein the step of converting the DL WAN MPDUs corresponding to one of the transport channels into a plurality of DL WLAN MPDUs comprising
if the size of one of the WAN MPDUs is larger than the size of a frame body of a 802.11 MAC frame, fragmenting, by the adapter, the WAN MPDU into several WLAN MPDUs.

17. A method of integrating multiple RATs using CA, for a base station to transmit data in an uplink path, comprising:
receiving, by a WLAN processing circuit of the base station which is related to a WLAN, a UL WLAN MPDU, wherein the UL WLAN MPDUs are 802.11 MAC frames;
converting, by an adapter of the base station, the UL WLAN MPDU into a UL WAN MPDU according to a mapping table, wherein the UL WAN MPDUs are cellular based MAC frames, and the mapping table comprises a WLAN MAC address and a Cell Radio Network Temporary Identifier (C-RNTI) of each of a plurality of User Equipments (UEs) in a radio coverage of the base station;

at time point T tx, transmitting, by a WAN processing circuit of the base station, a first UL grant message through a PDCCH from a primary Component Carrier (CC), and determining, by the WAN processing circuit, whether the UL WAN MPDU in response to the first UL grant message is received before time point T'tx, wherein the T'tx=Ttx+Δ, and Δ is a positive value bigger than 1 msec, wherein the WAN processing circuit is related to the cellular network; and if the UL WAN MPDU is received through a WLAN processing circuit of the base station before time point T'tx, transmitting, by the WAN processing circuit, a second UL grant message.

18. The method as claimed in claim 17, wherein the step of determining whether the UL WAN MPDU is received before time point T'tx further comprising:

if the UL WAN MPDU is not received before time point T'tx and a WAN retransmission limit is not reached, transmitting, by the WAN processing circuit, a NACK message on PHICH from the primary CC; and if the UL WAN MPDU is not received before time point T'tx and the WAN retransmission limit is reached, transmitting, by the WAN processing circuit, the second UL grant message.

19. The method as claimed in claim 17, wherein before the step of determining whether the UL WAN MPDU is received before time point T'tx, the method further comprising:

transmitting, by the WLAN processing circuit, a WLAN ACK message in response to the UL WLAN MPDU.

20. A user equipment, for integrating multiple RATs using CA, comprising:

a WAN processing circuit, receives a UL grant message corresponding to a first UL WAN MPDU on PDCCH, wherein the WAN processing circuit is related to a cellular network;

an adapter, coupled to the WAN processing circuit; and a WLAN processing circuit which is related to a WLAN, coupled to the adapter, wherein when the WAN processing circuit determines that the UL grant message comprising resource information corresponding to the WLAN, the WAN processing circuit transmits the first UL WAN MPDU to the adapter;

the adapter converts the first UL WAN MPDU into a first UL WLAN MPDU according to a mapping table and transmits the first UL WLAN MPDU to the WLAN processing circuit, wherein the first UL WLAN MPDUs are 802.11 MAC frames, the first UL WAN MPDUs are cellular based MAC frames, and the mapping table comprises a WLAN MAC address and a Cell Radio Network Temporary Identifier (C-RNTI) of the user Equipment in a radio coverage of a base station; and the WLAN processing circuit transmits the first UL WLAN MPDU.

21. The UE as claimed in claim 20, wherein the WAN processing circuit schedules to transmit the first UL WAN MPDU through the WLAN processing circuit at time point Trx, and schedules to transmit a second UL WAN MPDU through the WLAN processing circuit at time point T'rx, wherein the T'rx=Trx+C, and C is a positive constant bigger than 1 msec;

the WAN processing circuit determines whether a WAN ACK message in response to the first UL WAN MPDU received through the adapter before time point T'rx; and if the WAN ACK message in response to the first UL WAN MPDU is received before time point T'rx, the WAN processing circuit transmits the second UL WAN MPDU at time point T'rx as scheduled.

22. The UE as claimed in claim 21, wherein the WLAN processing circuit receives the WLAN ACK message in response to the first UL WAN MPDU, and transmits the WLAN ACK message; and the adapter converts the WLAN ACK message into the WAN ACK message.

23. The UE as claimed in claim 21, wherein if the WAN ACK message in response to the first UL WAN MPDU is not received through the adapter before time point T'rx, the WAN processing circuit schedules to re-transmit the first UL WAN MPDU through the WLAN processing circuit at time point T'tx; and the adapter ignores the re-transmitted first UL WAN MPDU when receiving the re-transmitted first UL WAN MPDU.

24. The UE as claimed in claim 20, wherein the WAN processing circuit receives scheduling information from the PDCCH, and determines whether a DL WAN MPDU is received through the WLAN at time point Ttx according to the scheduling information;

if WAN processing circuit determines that the DL WAN MPDU is scheduled to be received through the WLAN at time point Trx according to the scheduling information, the WAN processing circuit controls the WLAN processing circuit to receive a DL WLAN MPDU corresponding to the DL WAN MPDU; and the WLAN processing circuit waits to receive the DL WLAN MPDU until time point T'tx.

25. The UE as claimed in claim 24, wherein when the WLAN processing circuit receives the DL WLAN MPDU, the WLAN processing circuit transmits a WLAN ACK message in response to the DL WLAN MPDU; and the adapter receives the DL WLAN MPDU and converts the DL WLAN PDU into the DL WAN MPDU.

26. The UE as claimed in claim 24, wherein when the WAN processing circuit controls the WLAN processing circuit to receive the DL WLAN MPDU, the WAN processing circuit enables the WLAN processing circuit so as to receive the DL WLAN MPDU.

27. A method of integrating multiple RATs using CA, for a user equipment (UE), comprising:

receiving, by a WAN processing circuit of the UE, a UL grant message corresponding to a first UL WAN MPDU on PDCCH, wherein the WAN processing circuit is related to a cellular network;

determining, by the WAN processing circuit, whether the UL grant message comprising resource information corresponding to a WLAN; and when the UL grant message comprising resource information corresponding to the WLAN is determined, transmitting, by the WAN processing circuit, the first UL WAN MPDU to an adapter of the UE, converting, by the adapter, the first UL WAN MPDU into a first UL WLAN MPDU according to a mapping table, and transmitting, by a WLAN processing circuit of the UE which is related to the WLAN, the first UL WLAN MPDU, wherein the first UL WLAN MPDUs are 802.11 MAC frames, the first UL WAN MPDUs are cellular based MAC frames, and the mapping table comprises a WLAN MAC address and a Cell Radio Network Temporary Identifier (C-RNTI) of the user Equipment in a radio coverage of a base station.

28. The method as claimed in claim 27, wherein the step of transmitting the first UL WAN MPDU comprises:
   scheduling, by the WAN processing circuit, to transmit the first UL WAN MPDU through the WLAN processing circuit at time point Trx, and scheduling, by the WAN processing circuit, to transmit a second UL WAN MPDU through the WLAN processing circuit at time point T'rx, wherein the T'rx=Trx+C, and C is a positive constant bigger than 1 msec;
   determining, by the WAN processing circuit, whether a WAN ACK message in response to the first UL WAN MPDU received through the WLAN processing circuit before time point T'rx; and
   if the WAN ACK message in response to the first UL WAN MPDU is received before time point T'rx, transmitting, by the WAN processing circuit, the second UL WAN MPDU at time point T'rx as scheduled.

29. The method as claimed in claim 28, wherein the step of determining whether the WAN ACK message in response to the first UL WAN MPDU is received comprises:
   receiving, by the WLAN processing circuit, the WLAN ACK message in response to the first UL WAN MPDU, and transmitting the WLAN ACK message in response to the WLAN ACK message; and
   converting, by the adapter, the WLAN ACK message into the WAN ACK message.

30. The method as claimed in claim 28, wherein the step of determining whether the WAN ACK message in response to the first UL WAN MPDU is received further comprises:
   if the WAN ACK message in response to the first UL WAN MPDU is not received before time point T'rx or a NACK in response to the first UL WAN MPDU is received via PHICH, ignoring, by the adapter, scheduling to re-transmit the first UL WAN MPDU through the WLAN processing circuit at time point T'rx.

31. The method as claimed in claim 28, wherein the method further comprises:
   receiving, by the WAN processing circuit, scheduling information from the PDCCH, and determining whether a DL WAN MPDU is received through the WLAN at time point Ttx according to the scheduling information;
   if the DL WAN MPDU is scheduled to be received through the WLAN at time point Trx according to the scheduling information is determined, controlling, by the WAN processing circuit, the WLAN processing circuit to receive a DL WLAN MPDU corresponding to the DL WAN MPDU; and
   waiting to receive, by the WLAN processing circuit, the DL WLAN MPDU until time point T'tx.

32. The method as claimed in claim 31, wherein
   the step of waiting to receive the DL WLAN MPDU comprising:
   when receiving the DL WLAN MPDU, transmitting, by the WLAN processing circuit, a WLAN ACK message in response to the DL WLAN MPDU; and
   converting, by the adapter, the DL WLAN MPDU into the DL WAN MPDU.

33. The method as claimed in claim 31, wherein the step of controlling the WLAN processing circuit to receive the DL WLAN MPDU comprising:
   enabling, by the WAN processing circuit, the WLAN processing circuit so as to receive the DL WLAN MPDU.

* * * * *